US012567415B2

(12) United States Patent
Duffy et al.

(10) Patent No.: US 12,567,415 B2
(45) Date of Patent: Mar. 3, 2026

---

(54) PROVIDING AND CONTROLLING IMMERSIVE THREE-DIMENSIONAL ENVIRONMENTS

(71) Applicant: Apple Inc., Cupertino, CA (US)

(72) Inventors: Gavin K. Duffy, Los Gatos, CA (US); Lynn I. Streja, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 18/509,150

(22) Filed: Nov. 14, 2023

(65) Prior Publication Data

US 2024/0379102 A1 Nov. 14, 2024

Related U.S. Application Data

(60) Provisional application No. 63/465,196, filed on May 9, 2023.

(51) Int. Cl.
| | |
|---|---|
| *G10L 15/22* | (2006.01) |
| *G06F 3/01* | (2006.01) |
| *G06F 3/16* | (2006.01) |
| *G06T 15/50* | (2011.01) |
| *G06T 19/00* | (2011.01) |
| *G10L 15/18* | (2013.01) |

(52) U.S. Cl.
CPC .............. *G10L 15/22* (2013.01); *G06F 3/013* (2013.01); *G06F 3/167* (2013.01); *G06T 15/50* (2013.01); *G06T 19/006* (2013.01); *G10L 15/1815* (2013.01); *G06T 2210/62* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | |
|---|---|---|---|
| 3,357,173 | A | 12/1967 | Wyssen |
| 4,395,134 | A | 7/1983 | Luce |
| 5,088,070 | A | 2/1992 | Shiff et al. |
| 5,313,229 | A | 5/1994 | Gilligan et al. |
| 5,477,508 | A | 12/1995 | Will |

(Continued)

FOREIGN PATENT DOCUMENTS

| | | |
|---|---|---|
| CN | 1207517 A | 2/1999 |
| CN | 1330310 A | 1/2002 |

(Continued)

OTHER PUBLICATIONS

Notice of Allowance received for Japanese Patent Application No. 2023-095734, mailed on Nov. 8, 2024, 4 pages (1 page of English Translation and 3 pages of Official Copy).

(Continued)

*Primary Examiner* — Marcus T Riley
(74) *Attorney, Agent, or Firm* — YHE Law LLP

(57) ABSTRACT

The present disclosure generally relates to methods and interfaces for providing and controlling immersive outputs. In some examples, an immersive output including a displayed environmental effect is provided in response to a speech request from a user. While the immersive output including the displayed environmental effect is being provided, the immersive output is modified in response to receiving additional user inputs.

40 Claims, 16 Drawing Sheets

(56) References Cited

U.S. PATENT DOCUMENTS

| | | | |
|---|---|---|---|
| 5,519,393 A | 5/1996 | Brandestini | |
| 5,530,455 A | 6/1996 | Gillick et al. | |
| 5,563,631 A | 10/1996 | Masunaga | |
| 5,592,195 A | 1/1997 | Misono et al. | |
| 5,623,588 A | 4/1997 | Gould | |
| 5,691,747 A | 11/1997 | Amano | |
| 5,739,775 A | 4/1998 | Brandestini | |
| 5,825,353 A | 10/1998 | Will | |
| 5,852,413 A | 12/1998 | Bacchi et al. | |
| 5,874,961 A | 2/1999 | Bates et al. | |
| 5,903,229 A | 5/1999 | Kishi | |
| 5,940,521 A | 8/1999 | East et al. | |
| 5,960,366 A | 9/1999 | Duwaer | |
| 5,982,710 A | 11/1999 | Rawat et al. | |
| 6,081,256 A | 6/2000 | Martin et al. | |
| 6,161,957 A | 12/2000 | Guanter | |
| 6,203,190 B1 | 3/2001 | Stotz | |
| 6,249,689 B1 | 6/2001 | Aizawa | |
| 6,275,173 B1 | 8/2001 | Wu | |
| 6,297,795 B1 | 10/2001 | Kato et al. | |
| 6,300,939 B1 | 10/2001 | Decker et al. | |
| 6,305,234 B1 | 10/2001 | Thies et al. | |
| 6,310,648 B1 | 10/2001 | Miller et al. | |
| 6,351,657 B2 | 2/2002 | Yamada | |
| 6,396,482 B1 | 5/2002 | Griffin et al. | |
| 6,477,117 B1 | 11/2002 | Narayanaswami et al. | |
| 6,522,347 B1 | 2/2003 | Sakai et al. | |
| 6,525,997 B1 | 2/2003 | Narayanaswami et al. | |
| 6,535,461 B1 | 3/2003 | Karhu et al. | |
| 6,556,222 B1 | 4/2003 | Narayanaswami | |
| 6,636,197 B1 | 10/2003 | Goldenberg et al. | |
| 6,647,338 B1 | 11/2003 | Remlinger et al. | |
| 6,661,438 B1 | 12/2003 | Shiraishi et al. | |
| 6,700,564 B2 | 3/2004 | Mcloone et al. | |
| 6,720,860 B1 | 4/2004 | Narayanaswami | |
| 6,788,220 B2 | 9/2004 | Netzer et al. | |
| 6,809,275 B1 | 10/2004 | Cheng et al. | |
| 6,809,724 B1 | 10/2004 | Shiraishi et al. | |
| 6,842,169 B2 | 1/2005 | Griffin et al. | |
| 6,967,642 B2 | 11/2005 | Sangiovanni et al. | |
| 6,967,903 B2 | 11/2005 | Guanter et al. | |
| 7,046,230 B2 | 5/2006 | Zadesky et al. | |
| 7,075,513 B2 | 7/2006 | Silfverberg et al. | |
| 7,081,905 B1 | 7/2006 | Raghunath | |
| 7,116,317 B2 | 10/2006 | Gregorio et al. | |
| 7,143,355 B2 | 11/2006 | Yamaguchi et al. | |
| 7,146,005 B1 | 12/2006 | Anft et al. | |
| 7,168,047 B1 | 1/2007 | Huppi et al. | |
| 7,256,770 B2 | 8/2007 | Hinckley et al. | |
| 7,272,077 B2 | 9/2007 | Nobs et al. | |
| 7,286,063 B2 | 10/2007 | Gauthey et al. | |
| 7,286,119 B2 | 10/2007 | Miyashita et al. | |
| 7,317,449 B2 | 1/2008 | Robbins et al. | |
| 7,333,084 B2 | 2/2008 | Griffin et al. | |
| 7,423,658 B1 | 9/2008 | Uomori et al. | |
| 7,463,239 B2 | 12/2008 | Ledbetter et al. | |
| 7,469,381 B2 | 12/2008 | Ording | |
| 7,469,386 B2 | 12/2008 | Bear et al. | |
| 7,477,890 B1 | 1/2009 | Narayanaswami et al. | |
| 7,478,129 B1 | 1/2009 | Chemtob | |
| 7,499,040 B2 | 3/2009 | Zadesky et al. | |
| 7,506,269 B2 | 3/2009 | Lang et al. | |
| 7,519,468 B2 | 4/2009 | Orr et al. | |
| 7,669,134 B1 | 2/2010 | Christie et al. | |
| 7,725,419 B2 | 5/2010 | Lee et al. | |
| 7,794,138 B2 | 9/2010 | Hilfiker | |
| 7,836,437 B2 | 11/2010 | Kacmarcik | |
| 7,844,915 B2 | 11/2010 | Platzer et al. | |
| 7,853,900 B2 | 12/2010 | Nguyen et al. | |
| 7,856,255 B2 | 12/2010 | Tsuchiya et al. | |
| 7,865,817 B2 | 1/2011 | Ryan et al. | |
| 7,903,115 B2 | 3/2011 | Platzer et al. | |
| 7,916,157 B1 | 3/2011 | Kelley et al. | |
| 8,001,488 B1 | 8/2011 | Lam et al. | |
| 8,009,144 B2 | 8/2011 | Yajima et al. | |
| 8,018,455 B2 | 9/2011 | Shuster | |
| 8,068,604 B2 | 11/2011 | Leeds et al. | |
| 8,140,996 B2 | 3/2012 | Tomkins et al. | |
| 8,209,183 B1 | 6/2012 | Patel et al. | |
| 8,296,383 B2 | 10/2012 | Lindahl | |
| 8,307,306 B2 | 11/2012 | Komatsu et al. | |
| 8,311,727 B2 | 11/2012 | Eckstein et al. | |
| 8,311,838 B2 | 11/2012 | Lindahl et al. | |
| 8,345,665 B2 | 1/2013 | Vieri et al. | |
| 8,352,268 B2 | 1/2013 | Naik et al. | |
| 8,352,272 B2 | 1/2013 | Rogers et al. | |
| 8,355,919 B2 | 1/2013 | Silverman et al. | |
| 8,380,507 B2 | 2/2013 | Herman et al. | |
| 8,396,714 B2 | 3/2013 | Rogers et al. | |
| 8,448,083 B1 | 5/2013 | Migos et al. | |
| 8,458,278 B2 | 6/2013 | Christie et al. | |
| 8,600,743 B2 | 12/2013 | Lindahl et al. | |
| 8,607,156 B1 | 12/2013 | Jania et al. | |
| 8,620,662 B2 | 12/2013 | Bellegarda | |
| 8,639,516 B2 | 1/2014 | Lindahl et al. | |
| 8,645,137 B2 | 2/2014 | Bellegarda et al. | |
| 8,656,311 B1 | 2/2014 | Harper et al. | |
| 8,660,849 B2 | 2/2014 | Gruber et al. | |
| 8,670,979 B2 | 3/2014 | Gruber et al. | |
| 8,676,904 B2 | 3/2014 | Lindahl | |
| 8,677,283 B2 | 3/2014 | Fong | |
| 8,677,377 B2 | 3/2014 | Cheyer et al. | |
| 8,682,667 B2 | 3/2014 | Haughay | |
| 8,686,944 B1 | 4/2014 | Dayer et al. | |
| 8,688,446 B2 | 4/2014 | Yanagihara | |
| 8,706,472 B2 | 4/2014 | Ramerth et al. | |
| 8,706,503 B2 | 4/2014 | Cheyer et al. | |
| 8,713,119 B2 | 4/2014 | Lindahl et al. | |
| 8,717,302 B1 | 5/2014 | Qin et al. | |
| 8,719,006 B2 | 5/2014 | Bellegarda | |
| 8,719,014 B2 | 5/2014 | Wagner | |
| 8,731,942 B2 | 5/2014 | Cheyer et al. | |
| 8,762,156 B2 | 6/2014 | Chen | |
| 8,762,469 B2 | 6/2014 | Lindahl | |
| 8,768,702 B2 | 7/2014 | Mason et al. | |
| 8,799,000 B2 | 8/2014 | Guzzoni et al. | |
| 8,799,816 B2 | 8/2014 | Wells et al. | |
| 8,824,245 B2 | 9/2014 | Lau et al. | |
| 8,862,252 B2 | 10/2014 | Rottler et al. | |
| 8,868,400 B2 | 10/2014 | Susarla et al. | |
| 8,892,446 B2 | 11/2014 | Cheyer et al. | |
| 8,898,568 B2 | 11/2014 | Bull et al. | |
| 8,930,191 B2 | 1/2015 | Gruber et al. | |
| 8,977,255 B2 | 3/2015 | Freeman et al. | |
| 8,996,376 B2 | 3/2015 | Fleizach et al. | |
| 9,007,057 B2 | 4/2015 | Villaret | |
| 9,104,705 B2 | 8/2015 | Fujinaga | |
| 9,117,447 B2 | 8/2015 | Gruber et al. | |
| 9,262,612 B2 | 2/2016 | Cheyer | |
| 9,286,287 B1 | 3/2016 | Tierney | |
| 9,318,108 B2 | 4/2016 | Gruber et al. | |
| 9,330,720 B2 | 5/2016 | Lee | |
| 9,338,493 B2 | 5/2016 | Van Os et al. | |
| 9,368,114 B2 | 6/2016 | Larson et al. | |
| 9,377,865 B2 | 6/2016 | Berenson et al. | |
| 9,395,867 B2 | 7/2016 | Yach et al. | |
| 9,395,905 B2 | 7/2016 | Wherry | |
| 9,442,649 B2 | 9/2016 | Davis et al. | |
| 9,548,050 B2 | 1/2017 | Gruber et al. | |
| 9,571,645 B2 | 2/2017 | Quast et al. | |
| 9,626,955 B2 | 4/2017 | Fleizach et al. | |
| 9,628,844 B2 | 4/2017 | Conrad et al. | |
| 9,633,004 B2 | 4/2017 | Giuli et al. | |
| 9,633,660 B2 | 4/2017 | Haughay | |
| 9,633,674 B2 | 4/2017 | Sinha | |
| 9,668,121 B2 | 5/2017 | Naik et al. | |
| 9,697,822 B1 | 7/2017 | Naik et al. | |
| 9,715,875 B2 | 7/2017 | Piernot et al. | |
| 9,721,566 B2 | 8/2017 | Newendorp et al. | |
| 9,723,130 B2 | 8/2017 | Rand | |
| 9,818,400 B2 | 11/2017 | Paulik et al. | |
| 9,823,811 B2 | 11/2017 | Brown et al. | |
| 9,830,044 B2 | 11/2017 | Brown et al. | |
| 9,830,449 B1 | 11/2017 | Wagner | |

(56) References Cited

U.S. PATENT DOCUMENTS

| | | | |
|---|---|---|---|
| 9,858,925 B2 | 1/2018 | Gruber et al. | |
| 9,886,953 B2 | 2/2018 | Lemay et al. | |
| 9,922,642 B2 | 3/2018 | Pitschel et al. | |
| 9,966,065 B2 | 5/2018 | Gruber et al. | |
| 9,966,068 B2 | 5/2018 | Cash et al. | |
| 9,972,304 B2 | 5/2018 | Paulik et al. | |
| 9,986,419 B2 | 5/2018 | Naik et al. | |
| 10,048,748 B2 | 8/2018 | Sridharan et al. | |
| 10,049,663 B2 | 8/2018 | Orr et al. | |
| 10,049,668 B2 | 8/2018 | Huang et al. | |
| 10,074,360 B2 | 9/2018 | Kim | |
| 10,078,487 B2 | 9/2018 | Gruber et al. | |
| 10,083,688 B2 | 9/2018 | Piernot et al. | |
| 10,083,690 B2 | 9/2018 | Giuli et al. | |
| 10,088,972 B2 | 10/2018 | Brown et al. | |
| 10,089,072 B2 | 10/2018 | Piersol et al. | |
| 10,102,359 B2 | 10/2018 | Cheyer | |
| 10,169,329 B2 | 1/2019 | Futrell et al. | |
| 10,170,123 B2 | 1/2019 | Orr et al. | |
| 10,176,167 B2 | 1/2019 | Evermann | |
| 10,176,808 B1 | 1/2019 | Lovitt et al. | |
| 10,180,572 B2 * | 1/2019 | Osterhout | G06Q 30/02 |
| 10,185,542 B2 | 1/2019 | Carson et al. | |
| 10,186,254 B2 | 1/2019 | Williams et al. | |
| 10,192,552 B2 | 1/2019 | Raitio et al. | |
| 10,199,051 B2 | 2/2019 | Binder et al. | |
| 10,223,066 B2 | 3/2019 | Martel et al. | |
| 10,236,016 B1 | 3/2019 | Li et al. | |
| 10,241,644 B2 | 3/2019 | Gruber et al. | |
| 10,249,300 B2 | 4/2019 | Booker et al. | |
| 10,269,345 B2 | 4/2019 | Sanchez et al. | |
| 10,296,160 B2 | 5/2019 | Shah et al. | |
| 10,297,253 B2 | 5/2019 | Walker et al. | |
| 10,311,871 B2 | 6/2019 | Newendorp et al. | |
| 10,339,714 B2 | 7/2019 | Corso et al. | |
| 10,339,721 B1 | 7/2019 | Dascola et al. | |
| 10,373,381 B2 | 8/2019 | Nuernberger et al. | |
| 10,416,760 B2 | 9/2019 | Burns et al. | |
| 10,417,037 B2 | 9/2019 | Gruber et al. | |
| 10,475,446 B2 | 11/2019 | Gruber et al. | |
| 10,497,365 B2 | 12/2019 | Gruber et al. | |
| 10,521,946 B1 | 12/2019 | Roche et al. | |
| 10,540,976 B2 | 1/2020 | Van Os et al. | |
| 10,568,032 B2 | 2/2020 | Freeman et al. | |
| 10,585,957 B2 | 3/2020 | Heck et al. | |
| 10,586,369 B1 * | 3/2020 | Roche | G10L 13/00 |
| 10,642,934 B2 | 5/2020 | Heck et al. | |
| 10,643,611 B2 | 5/2020 | Lindahl | |
| 10,652,394 B2 | 5/2020 | Van Os et al. | |
| 10,659,851 B2 | 5/2020 | Lister et al. | |
| 10,671,428 B2 | 6/2020 | Zeitlin | |
| 10,691,473 B2 | 6/2020 | Karashchuk et al. | |
| 10,706,841 B2 | 7/2020 | Gruber et al. | |
| 10,732,708 B1 | 8/2020 | Roche et al. | |
| 10,747,498 B2 | 8/2020 | Stasior et al. | |
| 10,748,529 B1 | 8/2020 | Milden | |
| 10,791,176 B2 | 9/2020 | Phipps et al. | |
| 10,795,944 B2 | 10/2020 | Brown et al. | |
| 10,798,438 B2 | 10/2020 | Conrad et al. | |
| 10,832,031 B2 | 11/2020 | Kienzle et al. | |
| 10,978,090 B2 | 4/2021 | Binder et al. | |
| 11,087,759 B2 | 8/2021 | Lemay et al. | |
| 11,133,008 B2 | 9/2021 | Piernot et al. | |
| 11,151,899 B2 | 10/2021 | Pitschel et al. | |
| 11,152,002 B2 | 10/2021 | Walker et al. | |
| 11,348,582 B2 | 5/2022 | Lindahl | |
| 11,380,323 B2 | 7/2022 | Shin et al. | |
| 11,388,291 B2 | 7/2022 | Van Os et al. | |
| 11,495,218 B2 | 11/2022 | Newendorp et al. | |
| 11,507,183 B2 | 11/2022 | Manjunath et al. | |
| 11,605,380 B1 * | 3/2023 | Houston | G06V 20/00 |
| 11,995,301 B2 * | 5/2024 | Hylak | G06F 3/04842 |
| 12,124,673 B2 * | 10/2024 | Stauber | G06T 19/20 |
| 2001/0004337 A1 | 6/2001 | Paratte et al. | |
| 2001/0011991 A1 | 8/2001 | Wang et al. | |
| 2002/0019296 A1 | 2/2002 | Freeman et al. | |
| 2002/0027547 A1 | 3/2002 | Kamijo et al. | |
| 2002/0030665 A1 | 3/2002 | Ano | |
| 2002/0030668 A1 | 3/2002 | Hoshino et al. | |
| 2002/0036623 A1 | 3/2002 | Kano et al. | |
| 2002/0069071 A1 | 6/2002 | Knockeart et al. | |
| 2002/0101458 A1 | 8/2002 | Sangiovanni | |
| 2002/0118169 A1 | 8/2002 | Hinckley et al. | |
| 2002/0154150 A1 | 10/2002 | Ogaki et al. | |
| 2002/0154175 A1 | 10/2002 | Abello et al. | |
| 2002/0186621 A1 | 12/2002 | Lai et al. | |
| 2003/0025673 A1 | 2/2003 | Ledbetter et al. | |
| 2003/0076301 A1 | 4/2003 | Tsuk et al. | |
| 2003/0115384 A1 | 6/2003 | Sonehara et al. | |
| 2003/0122787 A1 | 7/2003 | Zimmerman et al. | |
| 2003/0123329 A1 | 7/2003 | Guanter et al. | |
| 2003/0128192 A1 | 7/2003 | van Os | |
| 2003/0142081 A1 | 7/2003 | Iizuka et al. | |
| 2003/0210286 A1 | 11/2003 | Gerpheide et al. | |
| 2004/0013042 A1 | 1/2004 | Farine et al. | |
| 2004/0047244 A1 | 3/2004 | Iino et al. | |
| 2004/0085328 A1 | 5/2004 | Maruyama et al. | |
| 2004/0100479 A1 | 5/2004 | Nakano et al. | |
| 2004/0113819 A1 | 6/2004 | Gauthey et al. | |
| 2004/0130580 A1 | 7/2004 | Howard et al. | |
| 2004/0145595 A1 | 7/2004 | Bennett | |
| 2004/0150621 A1 | 8/2004 | Bohn | |
| 2004/0155907 A1 | 8/2004 | Yamaguchi et al. | |
| 2004/0170270 A1 | 9/2004 | Takashima et al. | |
| 2004/0218472 A1 | 11/2004 | Narayanaswami et al. | |
| 2004/0225613 A1 | 11/2004 | Narayanaswami et al. | |
| 2005/0007884 A1 | 1/2005 | Lorenzato et al. | |
| 2005/0030279 A1 | 2/2005 | Fu | |
| 2005/0081164 A1 | 4/2005 | Hama et al. | |
| 2005/0097466 A1 | 5/2005 | Levi et al. | |
| 2005/0116941 A1 | 6/2005 | Wallington et al. | |
| 2005/0164623 A1 | 7/2005 | Huynh | |
| 2005/0168566 A1 | 8/2005 | Tada et al. | |
| 2005/0195216 A1 | 9/2005 | Kramer et al. | |
| 2005/0209051 A1 | 9/2005 | Santomassimo et al. | |
| 2005/0215848 A1 | 9/2005 | Lorenzato et al. | |
| 2005/0259077 A1 | 11/2005 | Adams et al. | |
| 2006/0007129 A1 | 1/2006 | Pletikosa et al. | |
| 2006/0020904 A1 | 1/2006 | Aaltonen et al. | |
| 2006/0026521 A1 | 2/2006 | Hotelling et al. | |
| 2006/0054427 A1 | 3/2006 | Jasso et al. | |
| 2006/0092177 A1 | 5/2006 | Blasko et al. | |
| 2006/0112350 A1 | 5/2006 | Kato et al. | |
| 2006/0152480 A1 | 7/2006 | Senn | |
| 2006/0174213 A1 | 8/2006 | Kato | |
| 2006/0181506 A1 | 8/2006 | Fyke et al. | |
| 2006/0290671 A1 | 12/2006 | Bohn et al. | |
| 2007/0046635 A1 | 3/2007 | Nishiyama et al. | |
| 2007/0063995 A1 | 3/2007 | Bailey et al. | |
| 2007/0085841 A1 | 4/2007 | Tsuk et al. | |
| 2007/0097151 A1 | 5/2007 | Rosenberg | |
| 2007/0120819 A1 | 5/2007 | Young et al. | |
| 2007/0132789 A1 | 6/2007 | Ording et al. | |
| 2007/0146337 A1 | 6/2007 | Ording et al. | |
| 2007/0150830 A1 | 6/2007 | Ording et al. | |
| 2007/0188460 A1 | 8/2007 | Bells et al. | |
| 2007/0211042 A1 | 9/2007 | Kim et al. | |
| 2007/0216661 A1 | 9/2007 | Chen et al. | |
| 2007/0226646 A1 | 9/2007 | Nagiyama et al. | |
| 2007/0229458 A1 | 10/2007 | Moon | |
| 2007/0234303 A1 * | 10/2007 | Takagawara | G06F 11/3698 |
| | | | 717/126 |
| 2007/0242569 A1 | 10/2007 | Inoue et al. | |
| 2007/0279401 A1 | 12/2007 | Ramstein et al. | |
| 2007/0290045 A1 | 12/2007 | Cisar | |
| 2007/0296711 A1 | 12/2007 | Yee et al. | |
| 2008/0001915 A1 | 1/2008 | Pihlaja et al. | |
| 2008/0004084 A1 | 1/2008 | Park et al. | |
| 2008/0123473 A1 | 5/2008 | Ozawa et al. | |
| 2008/0155475 A1 | 6/2008 | Duhig et al. | |
| 2008/0165161 A1 | 7/2008 | Platzer et al. | |
| 2008/0165210 A1 | 7/2008 | Platzer et al. | |
| 2008/0168382 A1 | 7/2008 | Louch et al. | |
| 2008/0168384 A1 | 7/2008 | Platzer et al. | |

(56) References Cited

U.S. PATENT DOCUMENTS

| | | |
|---|---|---|
| 2008/0168404 A1 | 7/2008 | Ording |
| 2008/0168478 A1 | 7/2008 | Platzer et al. |
| 2008/0204478 A1 | 8/2008 | Hung |
| 2008/0257701 A1 | 10/2008 | Wlotzka et al. |
| 2008/0288880 A1 | 11/2008 | Reponen et al. |
| 2009/0050465 A1 | 2/2009 | Asada et al. |
| 2009/0051649 A1 | 2/2009 | Rondel |
| 2009/0058823 A1 | 3/2009 | Kocienda |
| 2009/0059730 A1 | 3/2009 | Lyons et al. |
| 2009/0079698 A1 | 3/2009 | Takashima et al. |
| 2009/0109069 A1 | 4/2009 | Takasaki et al. |
| 2009/0143117 A1 | 6/2009 | Shin et al. |
| 2009/0152452 A1 | 6/2009 | Lee et al. |
| 2009/0156255 A1 | 6/2009 | Shin et al. |
| 2009/0196124 A1 | 8/2009 | Mooring et al. |
| 2009/0199130 A1 | 8/2009 | Tsern et al. |
| 2009/0228825 A1 | 9/2009 | Van Os et al. |
| 2009/0231271 A1 | 9/2009 | Heubel et al. |
| 2009/0288035 A1 | 11/2009 | Tunning et al. |
| 2009/0288039 A1 | 11/2009 | Mail et al. |
| 2009/0325563 A1 | 12/2009 | Horodezky et al. |
| 2010/0029327 A1 | 2/2010 | Jee |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0128570 A1 | 5/2010 | Smith et al. |
| 2010/0173678 A1 | 7/2010 | Kim et al. |
| 2010/0187074 A1 | 7/2010 | Manni |
| 2010/0220562 A1 | 9/2010 | Hozumi et al. |
| 2010/0229082 A1 | 9/2010 | Karmarkar et al. |
| 2010/0248778 A1 | 9/2010 | Biswas |
| 2010/0259481 A1 | 10/2010 | Oh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0280983 A1 | 11/2010 | Cho et al. |
| 2010/0305807 A1 | 12/2010 | Basir et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0018870 A1 | 1/2011 | Shuster |
| 2011/0025311 A1 | 2/2011 | Chauvin et al. |
| 2011/0055752 A1 | 3/2011 | Rubinstein et al. |
| 2011/0057886 A1 | 3/2011 | Ng et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0107264 A1 | 5/2011 | Akella |
| 2011/0112827 A1 | 5/2011 | Kennewick et al. |
| 2011/0119578 A1 | 5/2011 | Schwartz |
| 2011/0131494 A1 | 6/2011 | Ono et al. |
| 2011/0131531 A1 | 6/2011 | Russell et al. |
| 2011/0167262 A1 | 7/2011 | Ross et al. |
| 2011/0187355 A1 | 8/2011 | Dixon et al. |
| 2011/0224967 A1 | 9/2011 | Van Schaik |
| 2011/0252357 A1 | 10/2011 | Chaudhri |
| 2011/0252369 A1 | 10/2011 | Chaudhri |
| 2011/0296312 A1 | 12/2011 | Boyer et al. |
| 2011/0298830 A1 | 12/2011 | Lam |
| 2012/0026198 A1 | 2/2012 | Maesaka |
| 2012/0044267 A1 | 2/2012 | Fino et al. |
| 2012/0054670 A1 | 3/2012 | Rainisto |
| 2012/0062398 A1 | 3/2012 | Durand |
| 2012/0066621 A1 | 3/2012 | Matsubara |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0112859 A1 | 5/2012 | Park et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0186951 A1 | 7/2012 | Wu et al. |
| 2012/0223936 A1 | 9/2012 | Aughey et al. |
| 2012/0229521 A1 | 9/2012 | Hales et al. |
| 2012/0272181 A1 | 10/2012 | Rogers et al. |
| 2012/0278755 A1 | 11/2012 | Lehmann et al. |
| 2012/0304111 A1 | 11/2012 | Queru et al. |
| 2012/0306930 A1 | 12/2012 | Decker et al. |
| 2012/0324390 A1 | 12/2012 | Tao et al. |
| 2013/0024808 A1 | 1/2013 | Rainisto |
| 2013/0067390 A1 | 3/2013 | Kwiatkowski et al. |
| 2013/0111396 A1 | 5/2013 | Brid |
| 2013/0142016 A1 | 6/2013 | Pozzo Di Borgo et al. |
| 2013/0174034 A1 | 7/2013 | Brown et al. |
| 2013/0176020 A1 | 7/2013 | Chauvin et al. |
| 2013/0189579 A1 | 7/2013 | Havnor |
| 2013/0191220 A1 | 7/2013 | Dent et al. |
| 2013/0204813 A1 | 8/2013 | Master et al. |
| 2013/0205939 A1 | 8/2013 | Meerovitsch et al. |
| 2013/0218517 A1 | 8/2013 | Ausserlechner et al. |
| 2013/0258819 A1 | 10/2013 | Hoover |
| 2013/0283204 A1 | 10/2013 | Pasquero et al. |
| 2013/0303087 A1 | 11/2013 | Hauser et al. |
| 2013/0315038 A1 | 11/2013 | Ferren et al. |
| 2014/0002502 A1 | 1/2014 | Han |
| 2014/0028688 A1 | 1/2014 | Houjou et al. |
| 2014/0092143 A1 | 4/2014 | Vanblon et al. |
| 2014/0132640 A1 | 5/2014 | Sharma et al. |
| 2014/0137020 A1 | 5/2014 | Sharma et al. |
| 2014/0160157 A1 | 6/2014 | Poulos et al. |
| 2014/0168344 A1 | 6/2014 | Shoemake et al. |
| 2014/0237366 A1 | 8/2014 | Poulos et al. |
| 2014/0245221 A1 | 8/2014 | Dougherty et al. |
| 2014/0253487 A1 | 9/2014 | Bezinge et al. |
| 2014/0260776 A1 | 9/2014 | Burleson et al. |
| 2014/0267441 A1 | 9/2014 | Matas et al. |
| 2014/0306989 A1 | 10/2014 | Doubleday et al. |
| 2014/0310595 A1 | 10/2014 | Acharya et al. |
| 2014/0347289 A1 | 11/2014 | Lee et al. |
| 2015/0042640 A1 | 2/2015 | Algreatly |
| 2015/0127628 A1 | 5/2015 | Rathod |
| 2015/0193018 A1 | 7/2015 | Venable et al. |
| 2015/0205476 A1 | 7/2015 | Kuscher et al. |
| 2015/0277559 A1 | 10/2015 | Vescovi et al. |
| 2015/0363048 A1 | 12/2015 | Brown et al. |
| 2015/0370529 A1 | 12/2015 | Zambetti et al. |
| 2016/0018981 A1 | 1/2016 | Amerige et al. |
| 2016/0034133 A1 | 2/2016 | Wilson et al. |
| 2016/0034166 A1 | 2/2016 | Wilson et al. |
| 2016/0034167 A1 | 2/2016 | Wilson et al. |
| 2016/0062466 A1 | 3/2016 | Verweij et al. |
| 2016/0063828 A1 | 3/2016 | Verweij et al. |
| 2016/0098016 A1 | 4/2016 | Shedletsky et al. |
| 2016/0105308 A1 | 4/2016 | Dutt |
| 2016/0170598 A1 | 6/2016 | Zambetti et al. |
| 2016/0170625 A1 | 6/2016 | Zambetti et al. |
| 2016/0202866 A1 | 7/2016 | Zambetti |
| 2016/0209939 A1 | 7/2016 | Zambetti et al. |
| 2016/0259535 A1 | 9/2016 | Fleizach et al. |
| 2016/0269540 A1 | 9/2016 | Butcher et al. |
| 2017/0026509 A1 | 1/2017 | Rand |
| 2017/0139471 A1 | 5/2017 | Bury et al. |
| 2017/0270715 A1 | 9/2017 | Lindsay et al. |
| 2017/0295446 A1 | 10/2017 | Shivappa |
| 2017/0337035 A1 | 11/2017 | Choudhary et al. |
| 2018/0045963 A1 | 2/2018 | Hoover et al. |
| 2018/0103209 A1 | 4/2018 | Fischler et al. |
| 2018/0108357 A1 | 4/2018 | Liu |
| 2018/0157398 A1 | 6/2018 | Kaehler et al. |
| 2018/0300952 A1 | 10/2018 | Evans et al. |
| 2019/0065027 A1* | 2/2019 | Hauenstein ........... G06F 3/0488 |
| 2019/0096134 A1 | 3/2019 | Amacker et al. |
| 2019/0228581 A1 | 7/2019 | Dascola et al. |
| 2019/0347525 A1 | 11/2019 | Liem et al. |
| 2019/0362557 A1* | 11/2019 | Lacey .................... G06F 3/017 |
| 2019/0387352 A1 | 12/2019 | Jot et al. |
| 2019/0391726 A1 | 12/2019 | Iskandar et al. |
| 2020/0034162 A1 | 1/2020 | Takiya et al. |
| 2020/0090658 A1 | 3/2020 | Shin et al. |
| 2020/0110522 A1 | 4/2020 | Zambetti et al. |
| 2020/0135209 A1 | 4/2020 | Delfarah et al. |
| 2020/0218074 A1 | 7/2020 | Hoover et al. |

(56) References Cited

U.S. PATENT DOCUMENTS

| | | | |
|---|---|---|---|
| 2020/0219501 A1 | 7/2020 | Cartwright et al. | |
| 2020/0226823 A1 | 7/2020 | Stachniak et al. | |
| 2020/0372719 A1 | 11/2020 | Andjelic et al. | |
| 2021/0004146 A1 | 1/2021 | Linville et al. | |
| 2021/0012113 A1 | 1/2021 | Petill et al. | |
| 2021/0295602 A1 | 9/2021 | Scapel et al. | |
| 2021/0358294 A1 | 11/2021 | Parashar et al. | |
| 2022/0130126 A1 | 4/2022 | Delgado et al. | |
| 2022/0206298 A1* | 6/2022 | Goodman | G06F 3/011 |
| 2022/0326837 A1* | 10/2022 | Dessero | G06F 3/011 |
| 2023/0087244 A1 | 3/2023 | Akmal et al. | |
| 2023/0128422 A1* | 4/2023 | Li | G10L 15/24 |
| | | | 345/156 |
| 2024/0177424 A1 | 5/2024 | Herman et al. | |
| 2024/0379102 A1* | 11/2024 | Duffy | G06T 19/006 |
| 2024/0385741 A1 | 11/2024 | Zambetti et al. | |

FOREIGN PATENT DOCUMENTS

| | | | |
|---|---|---|---|
| CN | 1650251 A | 8/2005 | |
| CN | 1668992 A | 9/2005 | |
| CN | 1757011 A | 4/2006 | |
| CN | 101042300 A | 9/2007 | |
| CN | 101059730 A | 10/2007 | |
| CN | 101431545 A | 5/2009 | |
| CN | 101446802 A | 6/2009 | |
| CN | 101606123 A | 12/2009 | |
| CN | 101241407 B | 7/2011 | |
| CN | 102612679 A | 7/2012 | |
| CN | 102890612 A | 1/2013 | |
| CN | 101034328 B | 2/2013 | |
| CN | 202982930 U | 6/2013 | |
| CN | 106558310 A | 4/2017 | |
| CN | 108027738 A | 5/2018 | |
| EP | 1486860 A1 | 12/2004 | |
| EP | 1847920 A2 | 10/2007 | |
| EP | 2224317 A1 | 9/2010 | |
| EP | 2940556 A1 | 11/2015 | |
| EP | 3336805 A1 | 6/2018 | |
| JP | 2001-202178 A | 7/2001 | |
| JP | 2001-202181 A | 7/2001 | |
| JP | 2001-209827 A | 8/2001 | |
| JP | 2003-248544 A | 9/2003 | |
| JP | 2003-330586 A | 11/2003 | |
| JP | 2004-178584 A | 6/2004 | |
| JP | 2004-184396 A | 7/2004 | |
| JP | 2004-259063 A | 9/2004 | |
| JP | 2005-532607 A | 10/2005 | |
| JP | 2006-4260 A | 1/2006 | |
| JP | 2007-52023 A | 3/2007 | |
| JP | 2009-59382 A | 3/2009 | |
| JP | 2009-128296 A | 6/2009 | |
| JP | 2010-515978 A | 5/2010 | |
| JP | 2012-27797 A | 2/2012 | |
| JP | 2012-531607 A | 12/2012 | |
| JP | 2013-3718 A | 1/2013 | |
| JP | 2015-520456 A | 7/2015 | |
| KR | 10-2004-0107472 A | 12/2004 | |
| KR | 10-2007-0024702 A | 3/2007 | |
| KR | 10-0971452 B1 | 7/2010 | |
| KR | 10-2013-0027017 A | 3/2013 | |
| TW | D122820 S | 5/2008 | |
| WO | 96/19872 A1 | 6/1996 | |
| WO | 03/036457 A2 | 5/2003 | |
| WO | 03/058589 A2 | 7/2003 | |
| WO | 2006/037545 A2 | 4/2006 | |
| WO | 2008/085855 A1 | 7/2008 | |
| WO | 2008/086218 A2 | 7/2008 | |
| WO | 2011/126502 A1 | 10/2011 | |
| WO | 2011/163350 A1 | 12/2011 | |
| WO | 2013/173838 A2 | 11/2013 | |
| WO | 2014/008461 A1 | 1/2014 | |
| WO | 2016/075081 A1 | 5/2016 | |
| WO | 2016/191737 A2 | 12/2016 | |
| WO | 2017/200777 A1 | 11/2017 | |
| WO | 2018/014788 A1 | 1/2018 | |
| WO | 2018/090060 A1 | 5/2018 | |
| WO | 2019/231537 A1 | 12/2019 | |
| WO | 2020/208302 A1 | 10/2020 | |
| WO | 2021/061349 A1 | 4/2021 | |
| WO | 2021/062148 A1 | 4/2021 | |
| WO | 2021/188439 A1 | 9/2021 | |
| WO | 2022/067343 A2 | 3/2022 | |

OTHER PUBLICATIONS

Office Action received for Indian Patent Application No. 202218048937, mailed on Oct. 8, 2024, 7 pages.

Notice of Acceptance received for Australian Patent Application No. 2023237127, mailed on Jul. 1, 2025, 3 pages.

Office Action received for European Patent Application No. 20190670. 8, mailed on Mar. 6, 2025, 6 pages.

Office Action received for Australian Patent Application No. 2023237127, mailed on Jan. 15, 2025, 7 pages.

Guarese et al., "Cooking in the Dark: Exploring Spatial Audio as MR Assistive Technology for the Visually Impaired", 18th IFIP Conference on Human-Computer Interaction (INTERACT), Available online at: https://inria.hal.science/hal-04291191/file/520519_1_En_29_Chapter.pdf, Aug. 2021, 6 pages.

International Search Report and Written Opinion received for PCT Patent Application No. PCT/US2024/025865, mailed on Aug. 19, 2024, 9 pages.

Notice of Hearing received for Indian Patent Application No. 202018011347, mailed on Oct. 1, 2024, 2 pages.

Advisory Action received for U.S. Appl. No. 16/703,486, mailed on Nov. 15, 2022, 5 pages.

Applicant-Initiated Interview Summary received for U.S. Appl. No. 14/913,345, mailed on Nov. 4, 2019, 5 pages.

Applicant-Initiated Interview Summary received for U.S. Appl. No. 16/703,486, mailed on May 12, 2022, 4 pages.

Applicant-Initiated Interview Summary received for U.S. Appl. No. 16/703,486, mailed on Oct. 28, 2022, 5 pages.

Corrected Notice of Allowance received for U.S. Appl. No. 14/913,345, mailed on Apr. 13, 2020, 4 pages.

Corrected Notice of Allowance received for U.S. Appl. No. 16/703,486, mailed on May 16, 2024, 4 pages.

Decision of Appeal received for Korean Patent Application No. 10-2019-7028736, mailed on May 24, 2021, 16 pages (2 pages of English Translation and 14 pages of Official Copy).

Decision of Appeal received for Korean Patent Application No. 10-2021-7001918, mailed on Aug. 23, 2022, 14 pages (2 pages of English Translation and 12 pages of Official Copy).

Decision on Appeal received for Korean Patent Application No. 10-2016-7008474, mailed on Jan. 29, 2020, 21 pages (2 pages of English Translation and 19 pages of Official Copy).

Decision on Appeal received for U.S. Appl. No. 16/703,486, mailed on Mar. 6, 2024, 9 pages.

Decision to Grant received for European Patent Application No. 14772494.2, mailed on Jul. 23, 2020, 2 pages.

Examiner's Answer to Appeal Brief received for U.S. Appl. No. 16/703,486, mailed on Jun. 6, 2023, 20 pages.

Extended European Search Report received for European Patent Application No. 20190670.8, mailed on Nov. 2, 2020, 10 pages.

Final Office Action received for U.S. Appl. No. 14/913,345, mailed on Oct. 26, 2018, 20 pages.

Final Office Action received for U.S. Appl. No. 15/049,049 mailed on Jul. 12, 2018, 24 pages.

Final Office Action received for U.S. Appl. No. 15/049,049, mailed on May 23, 2017, 23 pages.

Final Office Action received for U.S. Appl. No. 16/703,486, mailed on Aug. 26, 2022, 14 pages.

FTScroller v0.2.2, Online available at https://github.com/ftlabs/ftscroller/tree/v0.2.2, Mar. 18, 2013, 9 pages.

Intention to Grant received for European Patent Application No. 14772494.2, mailed on Mar. 16, 2020, 10 pages.

(56) References Cited

OTHER PUBLICATIONS

International Preliminary Report on Patentability received for PCT Patent Application No. PCT/US2014/053951, mailed on Mar. 17, 2016, 9 pages.

International Search Report and Written Opinion received for PCT Patent Application No. PCT/US2014/053951, mailed on Dec. 8, 2014, 11 pages.

Narayanaswami et al., "Challenges and considerations for the design and production of a purpose-optimized body-worn wrist-watch computer", Online available at https://www.spiedigitallibrary.org/conference-proceedings-of-spie/5443/0000/Challenges-and-considerations-for-the-design-and-production-of-a/10.1117/12.561263.short?SSO=1, Defense, Security, and Cockpit Displays, vol. 5443, Sep. 15, 2004, 13 pages.

Non-Final Office Action received for U.S. Appl. No. 14/913,345, mailed on Apr. 5, 2018, 15 pages.

Non-Final Office Action received for U.S. Appl. No. 15/049,049 mailed on Dec. 15, 2017, 23 pages.

Non-Final Office Action received for U.S. Appl. No. 15/049,049, mailed on Feb. 6, 2019, 21 pages.

Non-Final Office Action received for U.S. Appl. No. 15/049,049, mailed on Nov. 9, 2016, 21 pages.

Non-Final Office Action received for U.S. Appl. No. 16/703,486, mailed on Jan. 27, 2022, 13 pages.

Non-Final Office Action received for U.S. Appl. No. 14/913,345, mailed on Jun. 26, 2019, 23 pages,.

Notice of Acceptance received for Australian Patent Application No. 2014315319, mailed on Oct. 12, 2017, 3 pages.

Notice of Acceptance received for Australian Patent Application No. 2018200289, mailed on Jul. 23, 2019, 3 pages.

Notice of Acceptance received for Australian Patent Application No. 2021212114, mailed on Jul. 7, 2023, 3 pages.

Notice of Allowance received for Chinese Patent Application No. 201480059543.9, mailed on Sep. 4, 2019, 2 pages (1 page of English Translation and 1 page of Official Copy).

Notice of Allowance received for Chinese Patent Application No. 201911127193.6, mailed on May 8, 2021, 4 pages (1 page of English Translation and 3 pages of Official Copy).

Notice of Allowance received for Chinese Patent Application No. 201911129908.1, mailed on Dec. 8, 2023, 4 pages (1 page of English Translation and 3 pages of Official Copy).

Notice of Allowance received for Japanese Patent Application No. 2016-537945, mailed on Aug. 3, 2018, 4 pages (1 page of English translation and 3 pages of Official copy).

Notice of Allowance received for Japanese Patent Application No. 2018-090084, mailed on May 24, 2019, 4 pages(1 page of English Translation and 3 pages of Official Copy).

Notice of Allowance received for Japanese Patent Application No. 2019-116590, mailed on Jul. 25, 2022, 15 pages (1 page of English Translation and 14 pages of Official Copy).

Notice of Allowance received for Japanese Patent Application No. 2021-111630, mailed on Mar. 15, 2024, 23 pages (1 page of English Translation and 22 pages of Official Copy).

Notice of Allowance received for Korean Patent Application No. 10-2018-7032106, mailed on Jun. 28, 2019, 5 pages ( 2 pages of English Translation and 3 pages of Official Copy).

Notice of Allowance received for Taiwanese Patent Application No. 103130520, mailed on Apr. 25, 2018, 4 pages (1 page of English Translation and 3 pages of Official copy).

Notice of Allowance received for U.S. Appl. No. 14/913,345, mailed on Feb. 10, 2020, 10 pages.

Notice of Allowance received for U.S. Appl. No. 15/049,049, mailed on Jul. 25, 2019, 8 pages.

Notice of Allowance received for U.S. Appl. No. 16/703,486, mailed on Apr. 29, 2024, 13 pages.

Notice of Hearing received for Indian Patent Application No. 201617008291, mailed on Jul. 4, 2023, 3 pages.

Office Action received for Australian Patent Application No. 2014315319, mailed on Aug. 3, 2017, 3 pages.

Office Action received for Australian Patent Application No. 2014315319, mailed on Oct. 17, 2016, 3 pages.

Office Action received for Australian Patent Application No. 2018200289, mailed on Apr. 9, 2019, 5 pages.

Office Action received for Australian Patent Application No. 2018200289, mailed on Dec. 4, 2018, 4 pages.

Office Action received for Australian Patent Application No. 2019257521, mailed on Apr. 8, 2021, 6 pages.

Office Action received for Australian Patent Application No. 2019257521, mailed on Aug. 7, 2020, 5 pages.

Office Action received for Australian Patent Application No. 2019257521, mailed on Jul. 27, 2021, 6 pages.

Office Action received for Australian Patent Application No. 2019257521, mailed on Oct. 21, 2020, 6 pages.

Office Action received for Australian Patent Application No. 2021212114, mailed on Feb. 14, 2023, 4 pages.

Office Action received for Australian Patent Application No. 2021212114, mailed on Jul. 29, 2022, 7 pages.

Office Action received for Australian Patent Application No. 2021212114, mailed on Oct. 28, 2022, 3 pages.

Office Action received for Chinese Patent Application No. 201480059543.9, mailed on Feb. 28, 2019, 16 pages (4 pages of English Translation and 12 pages of Official Copy).

Office Action received for Chinese Patent Application No. 201480059543.9, mailed on Jan. 26, 2018, 17 pages (4 pages of English Translation and 13 pages of Official Copy).

Office Action received for Chinese Patent Application No. 201480059543.9, mailed on Sep. 19, 2018, 18 pages (5 pages of English Translation and 13 pages of Official Copy).

Office Action received for Chinese Patent Application No. 201911127193.6, mailed on Dec. 17, 2020, 21 pages (10 pages of English Translation and 11 pages of Official Copy).

Office Action received for Chinese Patent Application No. 201911127810.2, mailed on Feb. 23, 2023, 12 pages (4 pages of English Translation and 8 pages of Official Copy).

Office Action received for Chinese Patent Application No. 201911127810.2, mailed on Jul. 26, 2023, 11 pages (5 pages of English Translation and 6 pages of Official Copy).

Office Action received for Chinese Patent Application No. 201911127810.2, mailed on May 18, 2023, 12 pages (6 pages of English Translation and 6 pages of Official Copy).

Office Action received for Chinese Patent Application No. 201911129908.1, mailed on Mar. 1, 2023, 17 pages (7 pages of English Translation and 10 pages of Official Copy).

Office Action received for European Patent Application No. 14772494.2, mailed on Jun. 20, 2017, 7 pages.

Office Action received for European Patent Application No. 14772494.2, mailed on Oct. 2, 2018, 9 pages.

Office Action received for European Patent Application No. 20190670.8, mailed on Dec. 22, 2023, 7 pages.

Office Action received for European Patent Application No. 20190670.8, mailed on Sep. 14, 2022, 6 pages.

Office Action received for Indian Patent Application No. 201617008291, mailed on Jan. 14, 2020, 7 pages.

Office Action received for Indian Patent Application No. 202018011347, mailed on Mar. 2, 2022, 6 pages.

Office Action received for Indian Patent Application No. 202018014953, mailed on Mar. 7, 2022, 7 pages.

Office Action received for Japanese Patent Application No. 2016-537945, mailed on Apr. 7, 2017, 6 pages (3 pages of English Translation and 3 pages of Official Copy).

Office Action received for Japanese Patent Application No. 2016-537945, mailed on Jan. 9, 2018, 5 pages (2 pages of English Translation and 3 pages of Official copy).

Office Action received for Japanese Patent Application No. 2018-090084, mailed on Feb. 15, 2019, 6 pages (3 pages of English Translation and 3 pages of Official copy).

Office Action received for Japanese Patent Application No. 2019-116590, mailed on Feb. 4, 2022, 17 pages (8 pages of English Translation and 9 pages of Official Copy).

Office Action received for Japanese Patent Application No. 2019-116590, mailed on Mar. 15, 2021, 6 pages (3 pages of English Translation and 3 pages of Official Copy).

(56)                    References Cited

OTHER PUBLICATIONS

Office Action received for Japanese Patent Application No. 2019-116590, mailed on Oct. 5, 2020, 6 pages (3 pages of English Translation and 3 pages of Official Copy).
Office Action received for Japanese Patent Application No. 2021-111630, mailed on Aug. 5, 2022, 8 pages (4 pages of English Translation and 4 pages of Official Copy).
Office Action received for Japanese Patent Application No. 2021-111630, mailed on Feb. 10, 2023, 9 pages (4 pages of English Translation and 5 pages of Official Copy).
Office Action received for Japanese Patent Application No. 2023-095734, mailed on Jul. 1, 2024, 6 pages (3 pages of English Translation and 3 pages of Official Copy).
Office Action received for Korean Patent Application No. 10-2016-7008474, mailed on Aug. 6, 2018, 10 pages (5 pages of English Translation and 5 pages of Official Copy).
Office Action received for Korean Patent Application No. 10-2016-7008474, mailed on Dec. 30, 2016, 10 pages (4 pages of English Translation and 6 pages of Official Copy).
Office Action received for Korean Patent Application No. 10-2016-7008474, mailed on May 15, 2018, 7 pages (3 pages of English Translation and 4 pages of Official Copy).
Office Action received for Korean Patent Application No. 10-2016-7008474, mailed on Nov. 27, 2017, 6 pages (2 pages of English Translation and 4 pages of Official Copy).
Office Action received for Korean Patent Application No. 10-2018-7032106, mailed on Dec. 26, 2018, 10 pages (4 pages of English translation and 6 pages of Official Copy).
Office Action received for Korean Patent Application No. 10-2019-7028736, mailed on May 7, 2020, 8 pages (3 pages of English Translation and 5 pages of Official Copy).
Office Action received for Korean Patent Application No. 10-2019-7028736, mailed on Nov. 28, 2019, 8 pages (3 pages of English Translation and 5 pages of Official Copy).
Office Action received for Korean Patent Application No. 10-2019-7028736, mailed on Oct. 22, 2020, 6 pages (3 pages of English Translation and 3 pages of Official Copy).
Office Action received for Korean Patent Application No. 10-2021-7001918, mailed on Apr. 28, 2022, 7 pages (3 pages of English Translation and 4 pages of Official Copy).
Office Action received for Korean Patent Application No. 10-2021-7001918, mailed on May 7, 2021, 5 pages (2 pages of English Translation and 3 pages of Official Copy).
Office Action received for Korean Patent Application No. 10-2021-7001918, mailed on Nov. 16, 2021, 12 pages (5 pages of English Translation and 7 pages of Official Copy).
Office Action received for Taiwanese Patent Application No. 103130520, issued on Apr. 17, 2017, 8 pages (3 pages of English Translation and 5 pages of Official Copy).
Office Action received for Taiwanese Patent Application No. 103130520, issued on Jan. 23, 2018, 5 pages (2 pages of English Translation and 3 pages of Official Copy).
Office Action received for Taiwanese Patent Application No. 103130520, issued on May 23, 2016, 38 pages (15 pages of English Translation and 23 pages of Official Copy).
Office Action received for Taiwanese Patent Application No. 103130520, issued on Oct. 1, 2015, 58 pages (22 pages of English translation and 36 pages of Official copy).
Office Action received for Taiwanese Patent Application No. 103130520, issued on Sep. 29, 2016, 39 pages (16 pages of English Translation and 23 pages of Official Copy).
Raghunath et al., "User Interfaces for Applications on a Wrist Watch", Personal and Ubiquitous Computing, vol. 6, No. 1, 2002, Springer, 2002, pp. 17-30.
Record of Oral Hearing received for U.S. Appl. No. 16/703,486, mailed on Feb. 21, 2024, 30 pages.
The interview with a key person. IBM and CITIZEN met and applied Linux to a watch, Ascii Corporation, vol. 25, No. 12., Dec.

12, 2001, pp. 136-143 (Official Copy only). {See Communication Under Rule 37 CFR § 1.98(a)(3)}.
WatchPad 1.5, Online Available at http://web.archive.org/web/20011205071448/http://www.trl.ibm.com:80/projects/ngm/index_e.htm, Dec. 5, 2001, 2 pages.
Watchpad 1.5.mpeg, YouTube.com, Online Available at <https://www.youtube.com/watch?v=7xjvVbeUn80>, Uploaded on Jun. 20, 2010, 2 pages.
Wikipedia,"Rotary encoder", Online Available at <https://en.wikipedia.org/wiki/Rotary_encoder>, Retrieved on May 17, 2017, 17 pages (10 pages of English Translation and 7 pages of Official Copy).
Ashbrook, Daniel L., "Enabling Mobile Microinteractions", Retrieved from the Internet: URL: http://danielashbrook.com/wp-content/uploads/2012/06/2009-Ashbrook-Thesis.pdf, May 2010, 186 pages.
Bell, Jason, "Machine Learning Hands-On for Developers and Technical Professionals", Wiley, 2014, 82 pages.
Cambria et al., "Jumping NLP curves: A Review of Natural Language Processing Research", IEEE Computational Intelligence magazine, 2014, vol. 9, May 2014, pp. 48-57.
Edim et al., "A Multi-Agent Based Virtual Personal Assistant for E-Health Service", Journal of Information Engineering and Applications, vol. 3, No. 11, 2013, 9 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Kruger et al., "Virtual World Accessibility with the Perspective Viewer", Proceedings of ICEAPVI, Athens, Greece, Feb. 12-14, 2015, 6 pages.
Muller et al., "A Taxonomy for Information Linking in Augmented Reality", AVR 2016, Part I, LNCS 9768, 2016, pp. 368-387.
Phoenix Solutions Inc., "Declaration of Christopher Schmandt Regarding the MIT Galaxy System", West Interactive Corp., a Delaware Corporation, Document 40, Jul. 2, 2010, 162 pages.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Rowland et al., "Designing Connected Products: UX for the Consumer Internet of Things", O'Reilly, May 2015, 452 pages.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Intention to Grant received for European Patent Application No. 20190670.8, mailed on Nov. 6, 2025, 10 pages.
International Preliminary Report on Patentability received for PCT Patent Application No. PCT/US2024/025865, mailed on Nov. 20, 2025, 6 pages.

* cited by examiner

Point of Gaze

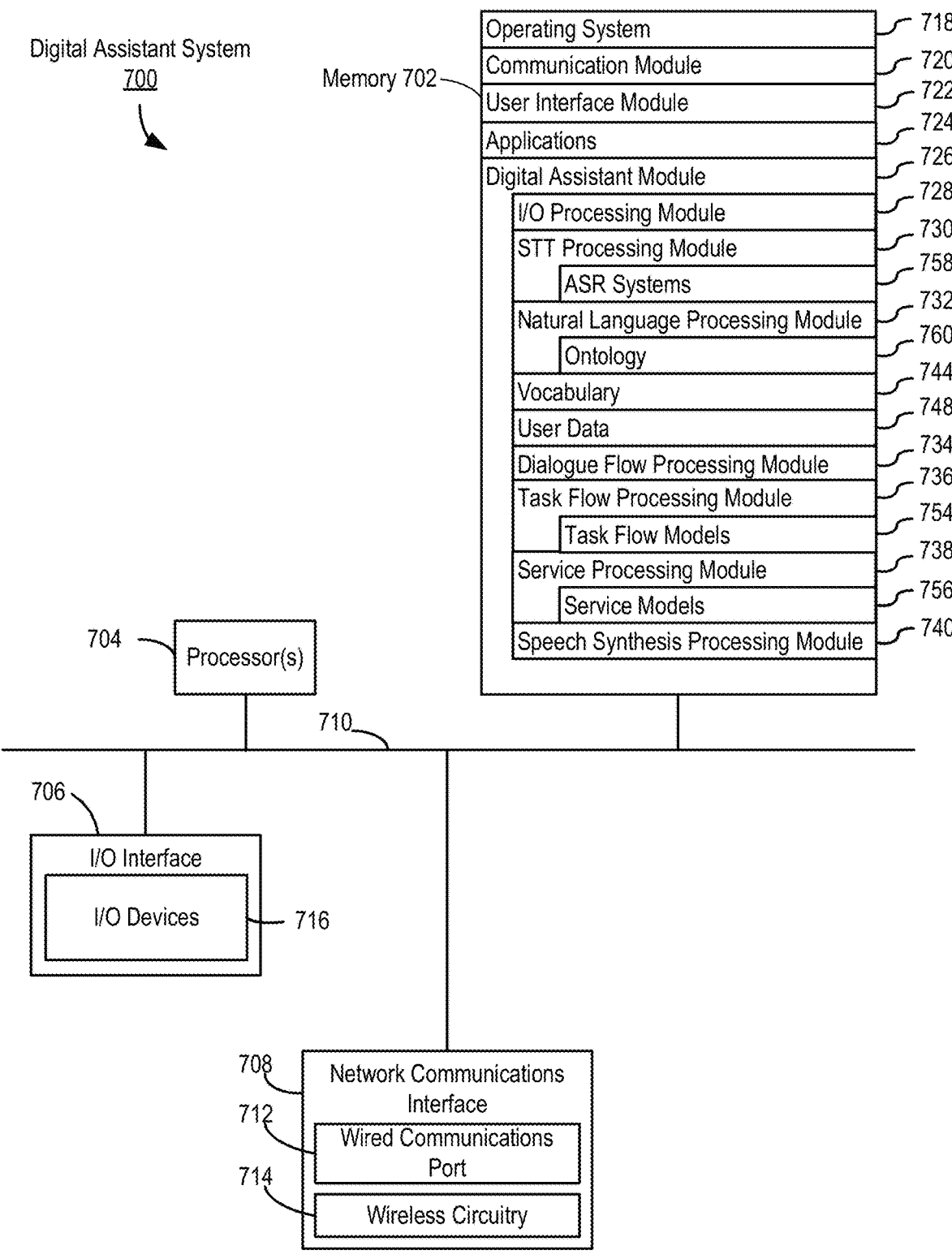

Digital Assistant System
700

Memory 702

Operating System — 718
Communication Module — 720
User Interface Module — 722
Applications — 724
Digital Assistant Module — 726
  I/O Processing Module — 728
  STT Processing Module — 730
    ASR Systems — 758
  Natural Language Processing Module — 732
    Ontology — 760
  Vocabulary — 744
  User Data — 748
  Dialogue Flow Processing Module — 734
  Task Flow Processing Module — 736
    Task Flow Models — 754
  Service Processing Module — 738
    Service Models — 756
  Speech Synthesis Processing Module — 740

704 — Processor(s)

710

706 — I/O Interface
  I/O Devices — 716

708 — Network Communications Interface
712 — Wired Communications Port
714 — Wireless Circuitry

HEY ASSISTANT, WHAT ENVIRONMENTS DO I HAVE?    812

806A 810    814

GO TO THE BEACH ON A SUNNY DAY    816

PROVIDING AND CONTROLLING IMMERSIVE THREE-DIMENSIONAL ENVIRONMENTS

CROSS-REFERENCE TO RELATED APPLICATIONS

This application claims priority to U.S. Provisional Patent Application Ser. No. 63/465,196, entitled "PROVIDING AND CONTROLLING IMMERSIVE THREE-DIMEN-SIONAL ENVIRONMENTS," filed on May 9, 2023, the contents of which are hereby incorporated by reference in their entirety.

TECHNICAL FIELD

The present disclosure relates generally to computer systems that are in communication with a display generation component that provide computer-generated experiences, including, but not limited to, electronic devices that provide immersive virtual reality and mixed reality (e.g., extended reality (XR)) experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for providing and controlling immersive extended reality (XR) outputs (e.g., augmented reality environments, mixed reality environments, and virtual reality environments) are cumbersome, inefficient, and limited. For example, head-mounted devices (HMDs) allow users to immerse themselves in extended reality environments. However, compared to content viewed on a television, phone, or other traditional display, immersive virtual content viewed using an HMD dominates the user's field-of-view, which can overwhelm users and is not conducive to multitasking (e.g., performing actions outside of the context of the XR environment, such as actions in the physical world or actions in a non-XR application). Additionally, immersive XR environments viewed using an HMD can be difficult, confusing, or frustrating to control using conventional methods, as users may struggle to find or use conventional displayed user interface elements and controls in the relatively large field-of-view, while prominently placed or numerous displayed user interface elements can reduce users' feelings of immersion in the environment. These cumbersome XR controls also take longer than necessary to use, thereby wasting energy of the computer system. This latter consideration is particularly important in battery-operated devices.

Accordingly, there is a need for computer systems with improved methods and interfaces for providing and controlling immersive XR outputs that make interaction with the computer systems more efficient and intuitive for a user.

Such methods and interfaces optionally complement or replace conventional methods for providing immersive XR outputs to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for providing and controlling immersive XR outputs. Such methods and interfaces may complement or replace conventional methods for providing and controlling immersive XR outputs. Such methods and interfaces reduce the number, extent, and/or difficulty (e.g., cognitive and/or physical burden) of the inputs from a user and produce a more efficient human-machine interface while preserving the feeling of immersion in XR environments. For battery-operated computing devices, such methods and interfaces conserve power and increase the time between battery charges.

Example methods are disclosed herein. An example method includes, at an electronic device having one or more displays, one or more processors, and memory: receiving a first spoken input; in response to determining that the first spoken input includes a request for an immersive output, providing a first immersive output, wherein providing the first immersive output includes displaying a first environmental effect; while providing the first immersive output, receiving a first user input; and in response to receiving the first user input, modifying the first immersive output.

Example non-transitory computer-readable media are disclosed herein. An example non-transitory computer-readable storage medium stores one or more programs. The one or more programs comprise instructions, which when executed by one or more processors of an electronic device, cause the electronic device to: receive a first spoken input; in response to determining that the first spoken input includes a request for an immersive output, provide a first immersive output, wherein providing the first immersive output includes displaying a first environmental effect; while providing the first immersive output, receive a first user input; and in response to receiving the first user input, modify the first immersive output.

Example electronic devices are disclosed herein. An example electronic device comprises one or more processors; a memory; and one or more programs, where the one or more programs are stored in the memory and configured to be executed by the one or more processors, the one or more programs including instructions for: receiving a first spoken input; in response to determining that the first spoken input includes a request for an immersive output, providing a first immersive output, wherein providing the first immersive output includes displaying a first environmental effect; while providing the first immersive output, receiving a first user input; and in response to receiving the first user input, modifying the first immersive output.

An example electronic device comprises: means for receiving a first spoken input; means for, in response to determining that the first spoken input includes a request for an immersive output, providing a first immersive output, wherein providing the first immersive output includes displaying a first environmental effect; means for, while providing the first immersive output, receiving a first user input; and means for, in response to receiving the first user input, modifying the first immersive output.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 7A is a block diagram illustrating a digital assistant system or a server portion thereof, according to various examples.

DESCRIPTION OF EMBODIMENTS

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, in response to receiving a spoken user input requesting an immersive output, an output including, for example, an XR environment (e.g., a "place") or an XR atmosphere (e.g., an "atmosphere") fully or partially superimposed over the current physical environment (e.g., using a head-mounted device (HMD) or other device for viewing physical and XR environments, such as a handheld device used as a viewfinder) is provided to the user. While the immersive output is being provided, the user can provide further inputs (e.g., speech inputs, hardware inputs, or the like) to modify the immersive output, for example, by changing the parameters of the immersive output (e.g., the particular place or atmosphere being displayed, the level of immersion, or other settings) or by causing the immersive output to cease. By allowing the user to launch and control immersive outputs using a combination of speech and other input types, the user is provided with efficient and intuitive control of immersive outputs without reducing the feeling of immersion due to excessive, unnecessary, or difficult-to-use displayed controls.

Figures 8A, 8B, 8C:
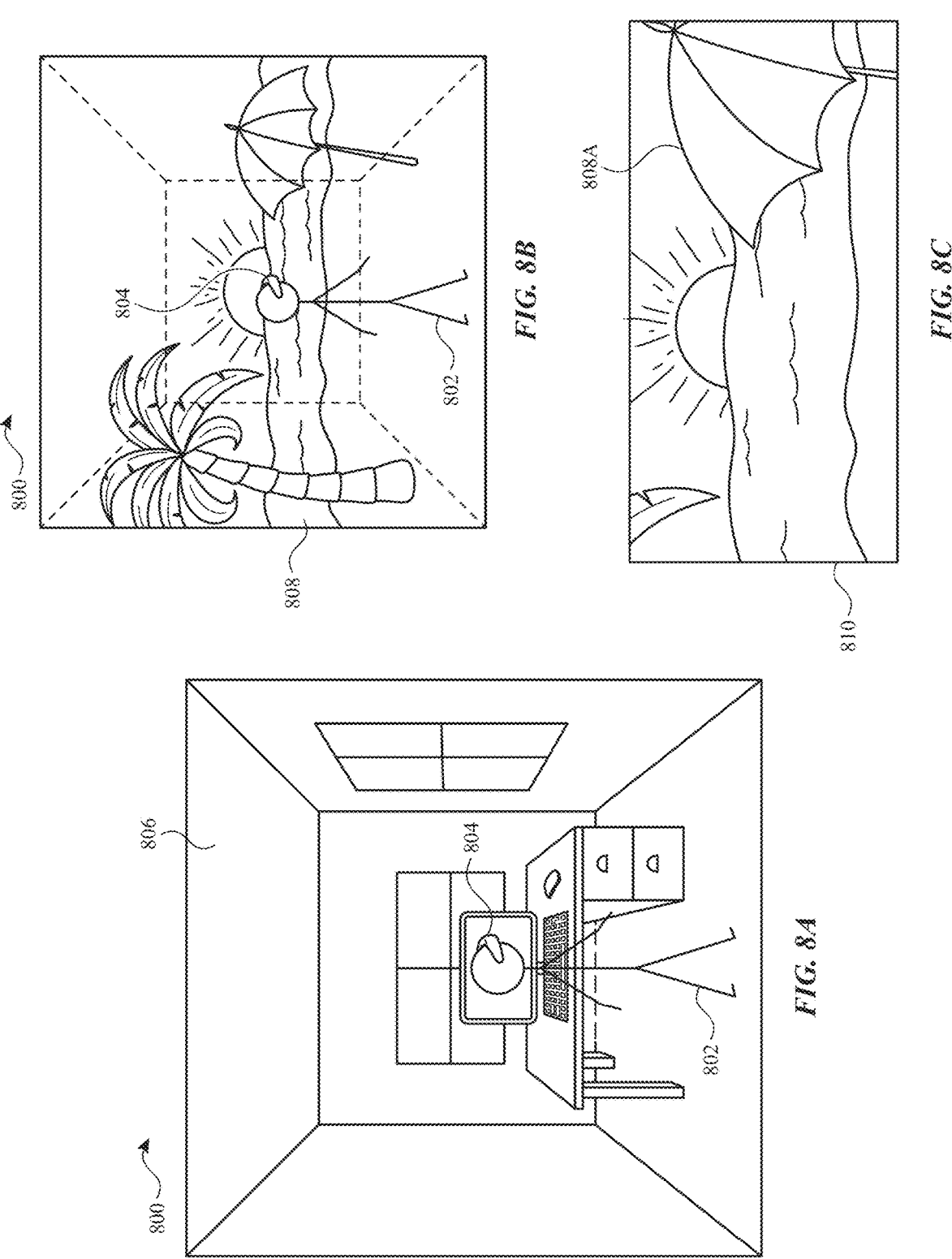
FIGS. 8A-8N illustrate example techniques for providing and controlling an immersive XR output, in some embodiments.
Figure 8N:
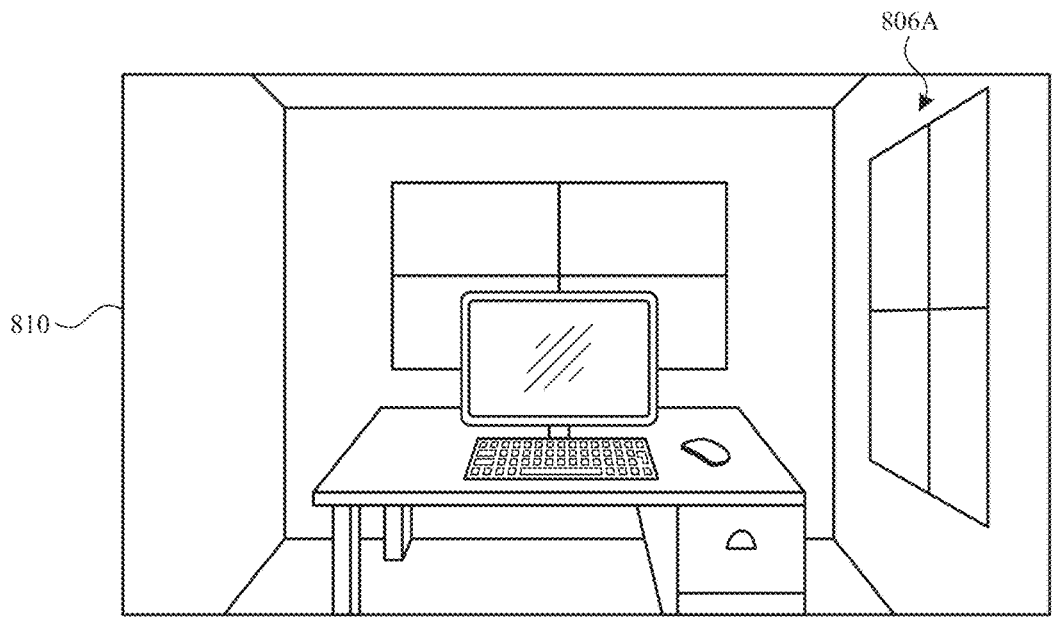
Figure 9:
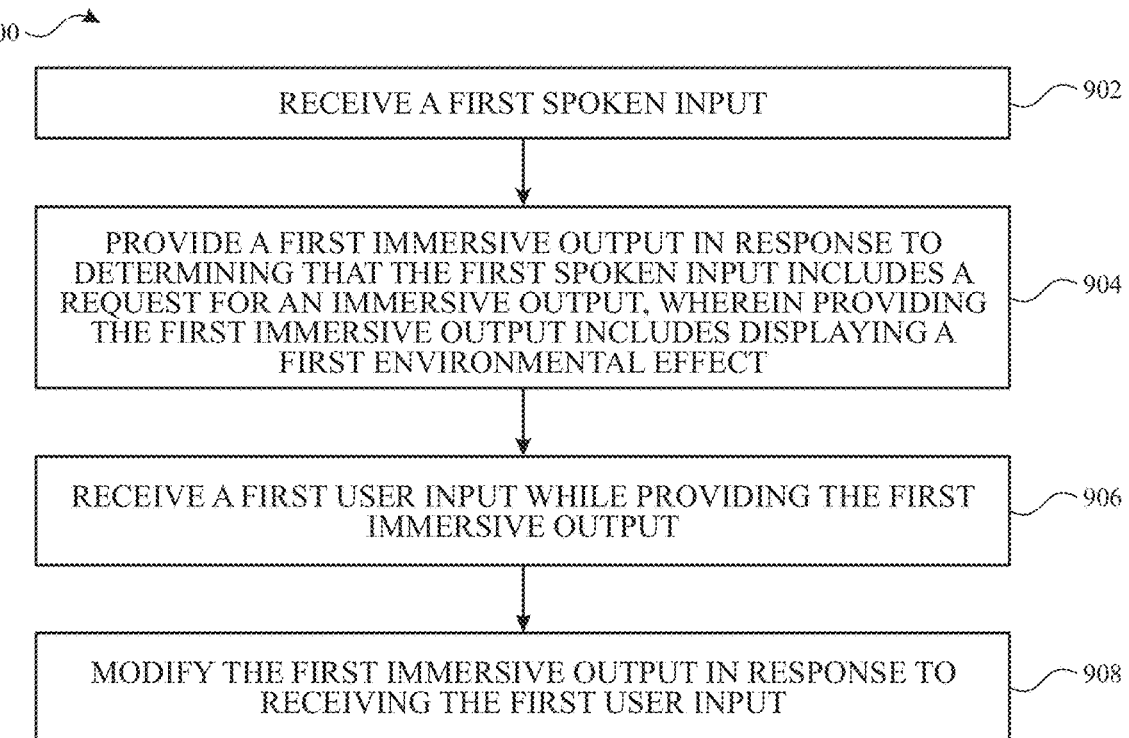
FIG. 9 is a flow diagram of methods of providing and controlling an immersive XR output, in some embodiments.

FIGS. 1-7C provide a description of example computer systems for providing XR experiences to users. FIGS. 8A-8N illustrate example techniques for providing and controlling an immersive XR output, in some embodiments. FIG. 9 is a flow diagram of methods of providing and controlling an immersive XR output, in some embodiments.

The processes described below enhance the operability of the devices and make the user-device interfaces more efficient (e.g., by helping the user to provide proper inputs and reducing user mistakes when operating/interacting with the device) through various techniques, including by reducing the number of inputs needed to perform an operation, providing additional control options without cluttering the user interface with additional displayed controls, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
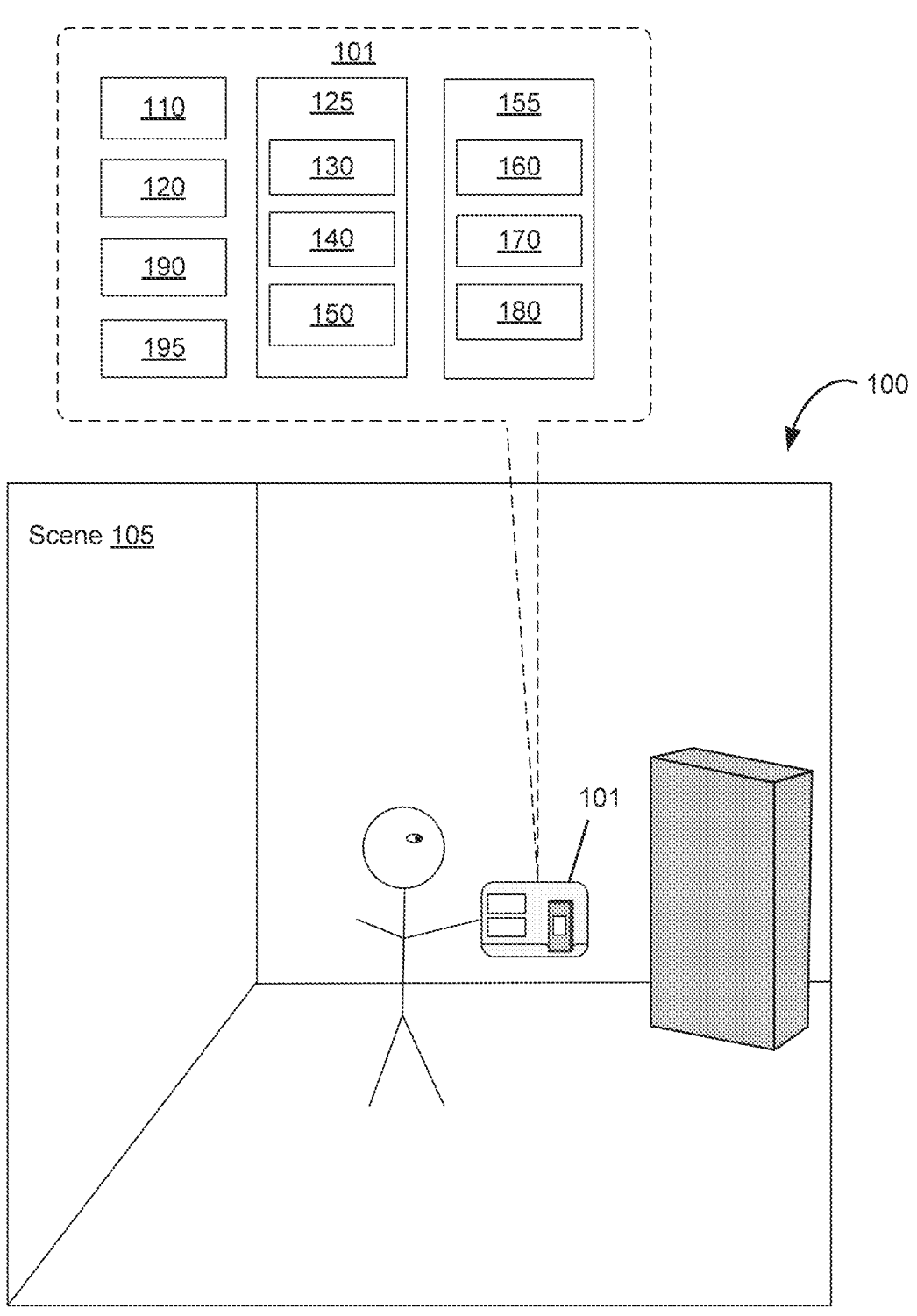
FIG. 1 is a block diagram illustrating an operating environment of a computer system for providing XR experiences in some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or over-lapping fields-of-view, for concurrent display. A first image representing a first perspective is presented to a first eye of the viewer and a second image representing a second perspective, different from the first perspective, is concur-rently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concur-rently presented to a second eye of the viewer. The first video and the second video have the same or overlapping fields-of-view. In some embodiments, the first video and the second video, when viewed together, create a depth effect and provide the viewer with depth perception for the con-tents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is option-ally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar ana-tomical characteristics. In some embodiments, a personal-ized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical wave-guide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is config-ured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation com-ponent 120 (e.g., an HMD, a display, a projector, a touch-screen, etc.) via one or more wired or wireless communi-cation channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodi-ments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room con-figured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be imple-mented with an HMD where the interactions happen in a space in front of the HMD and the responses of the XR content are displayed via the HMD. Similarly, a user inter-face showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
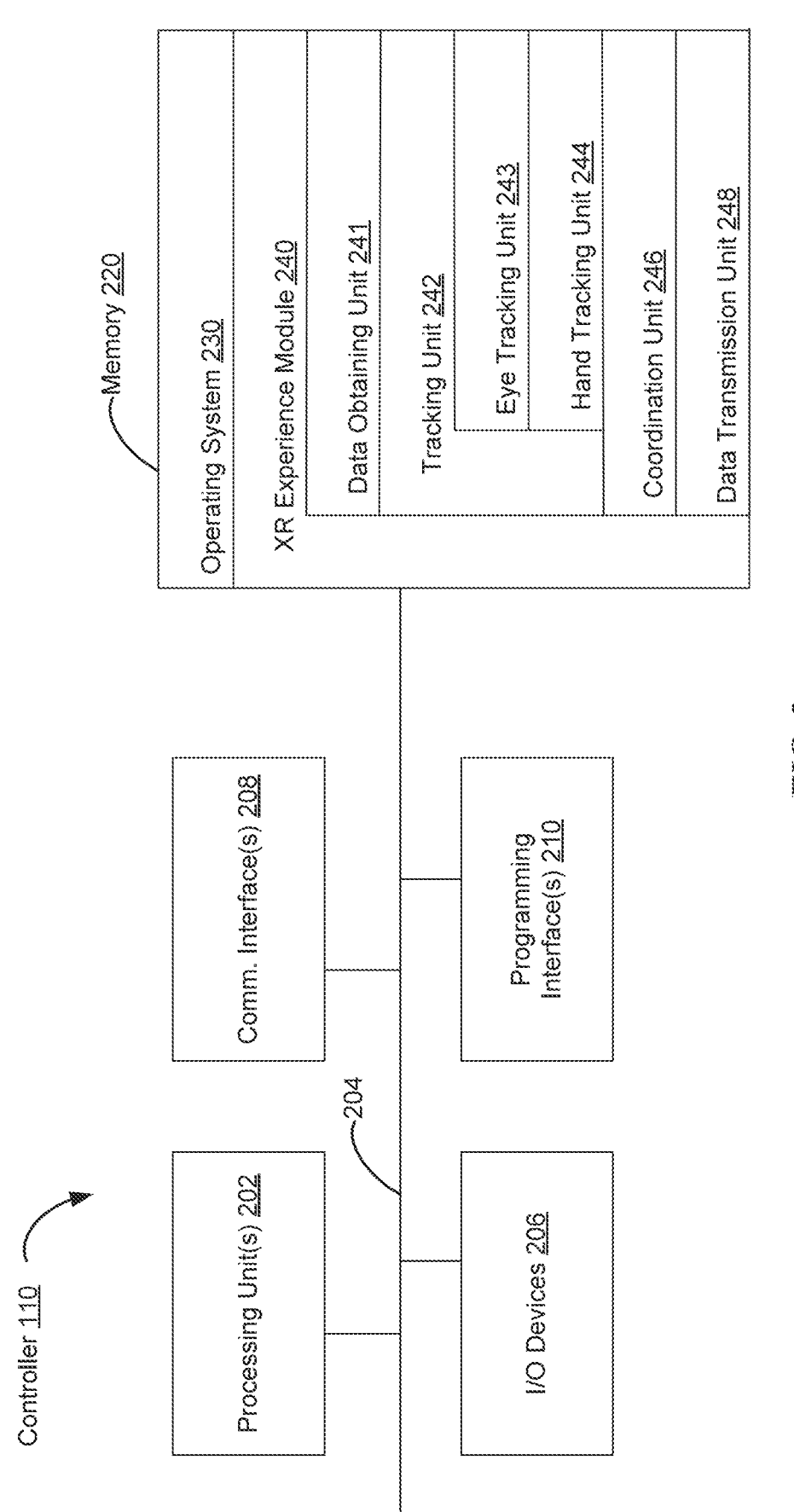
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments dis-closed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
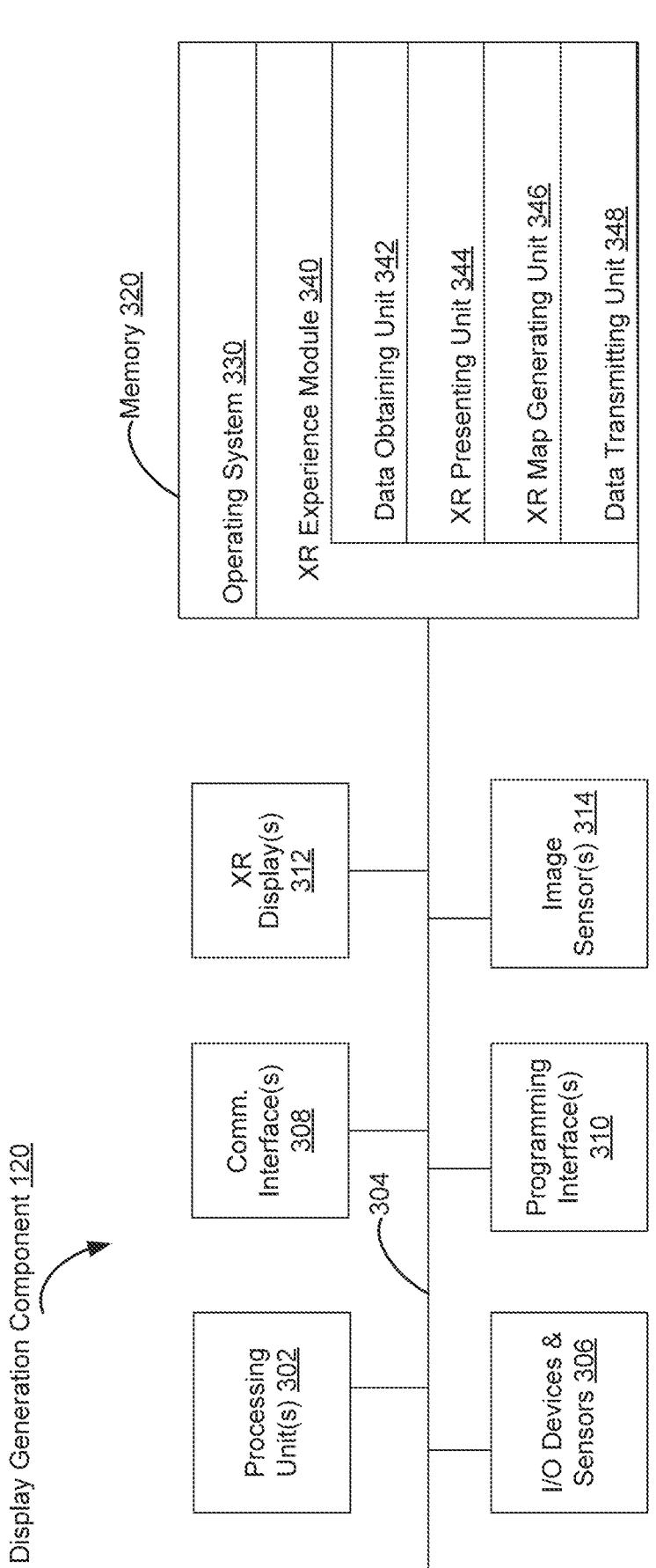
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICS, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. n some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
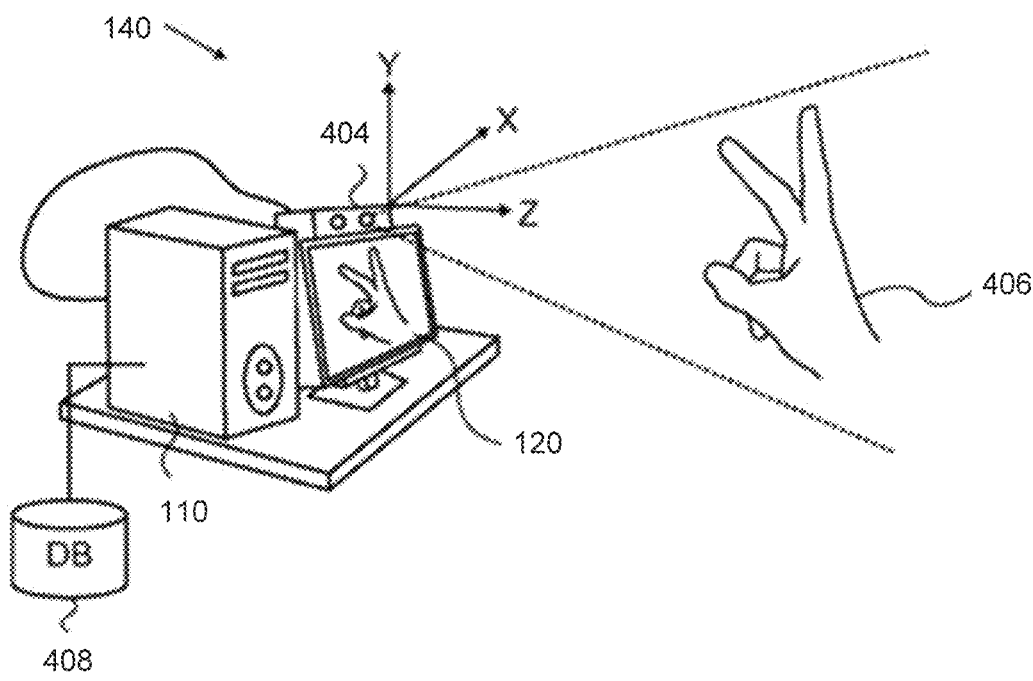
FIG. 4 is a block diagram illustrating a hand tracking unit of a computer system that is configured to capture gesture inputs of the user in some embodiments.
Figure 4:
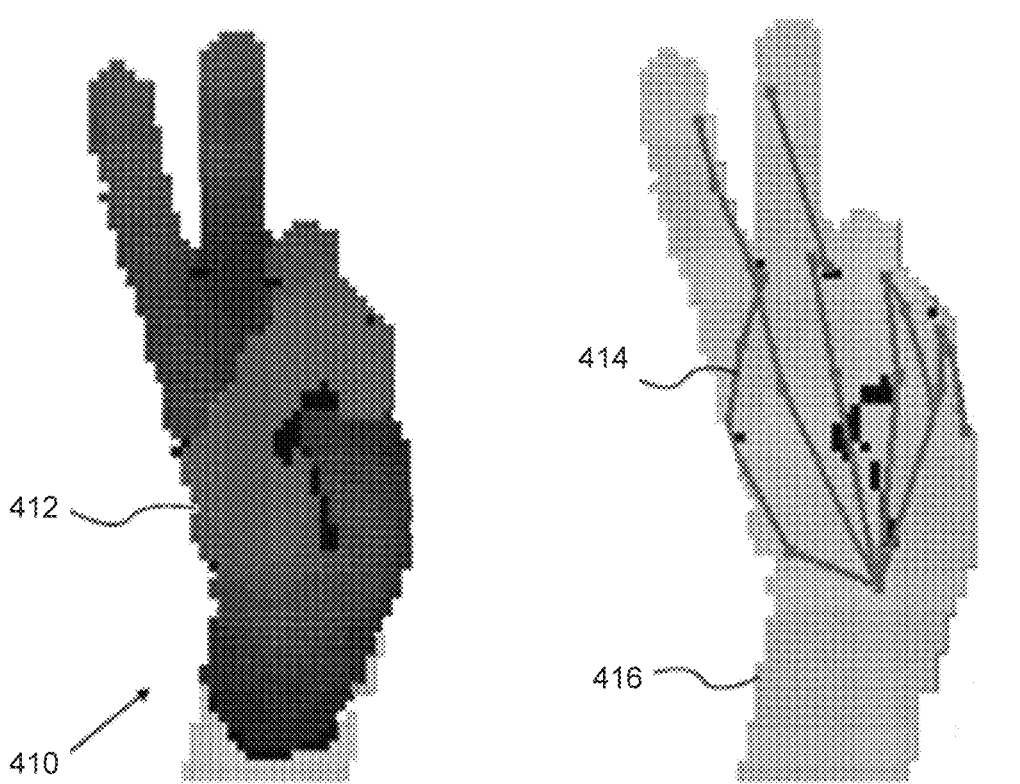

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
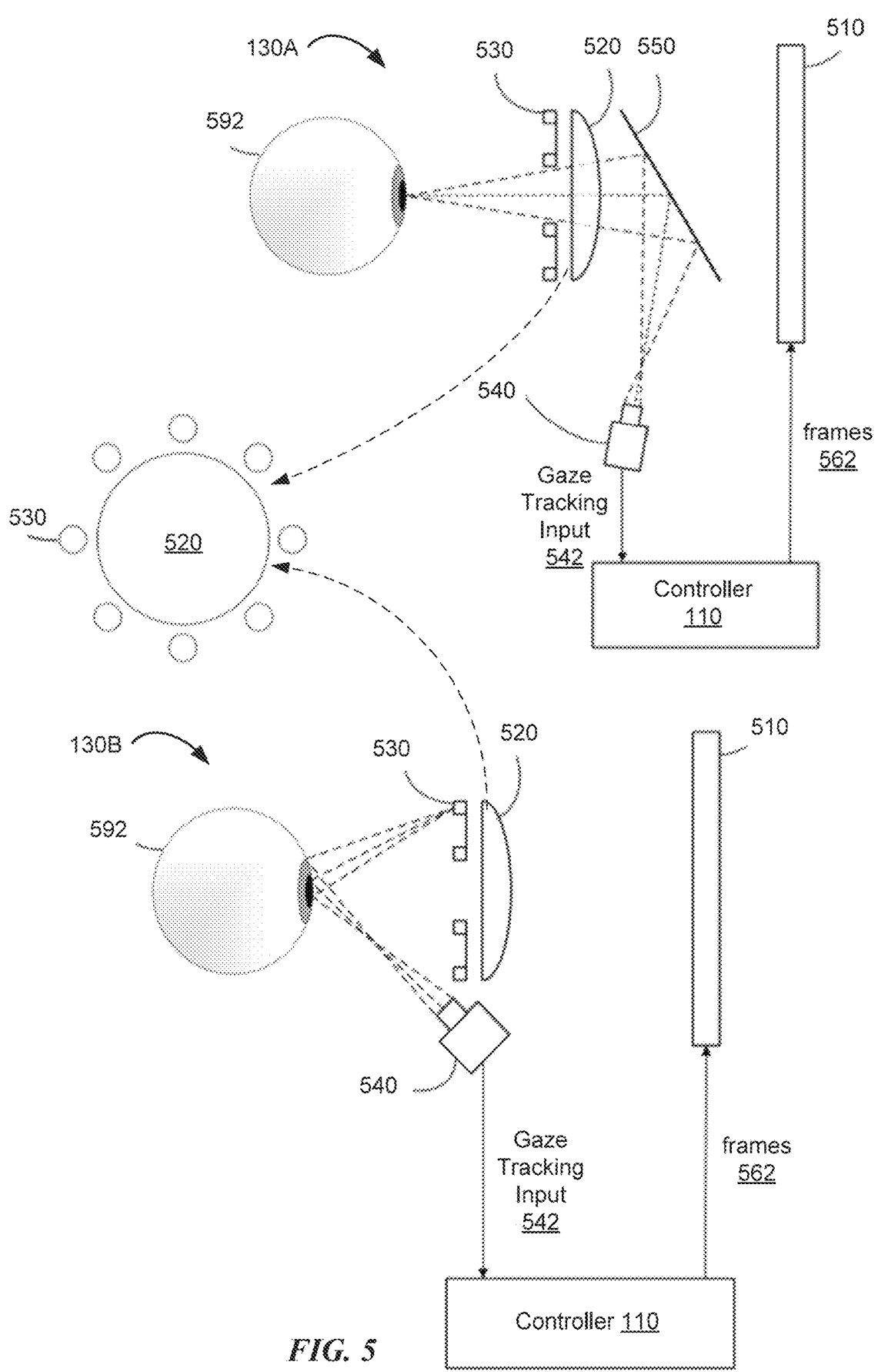
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
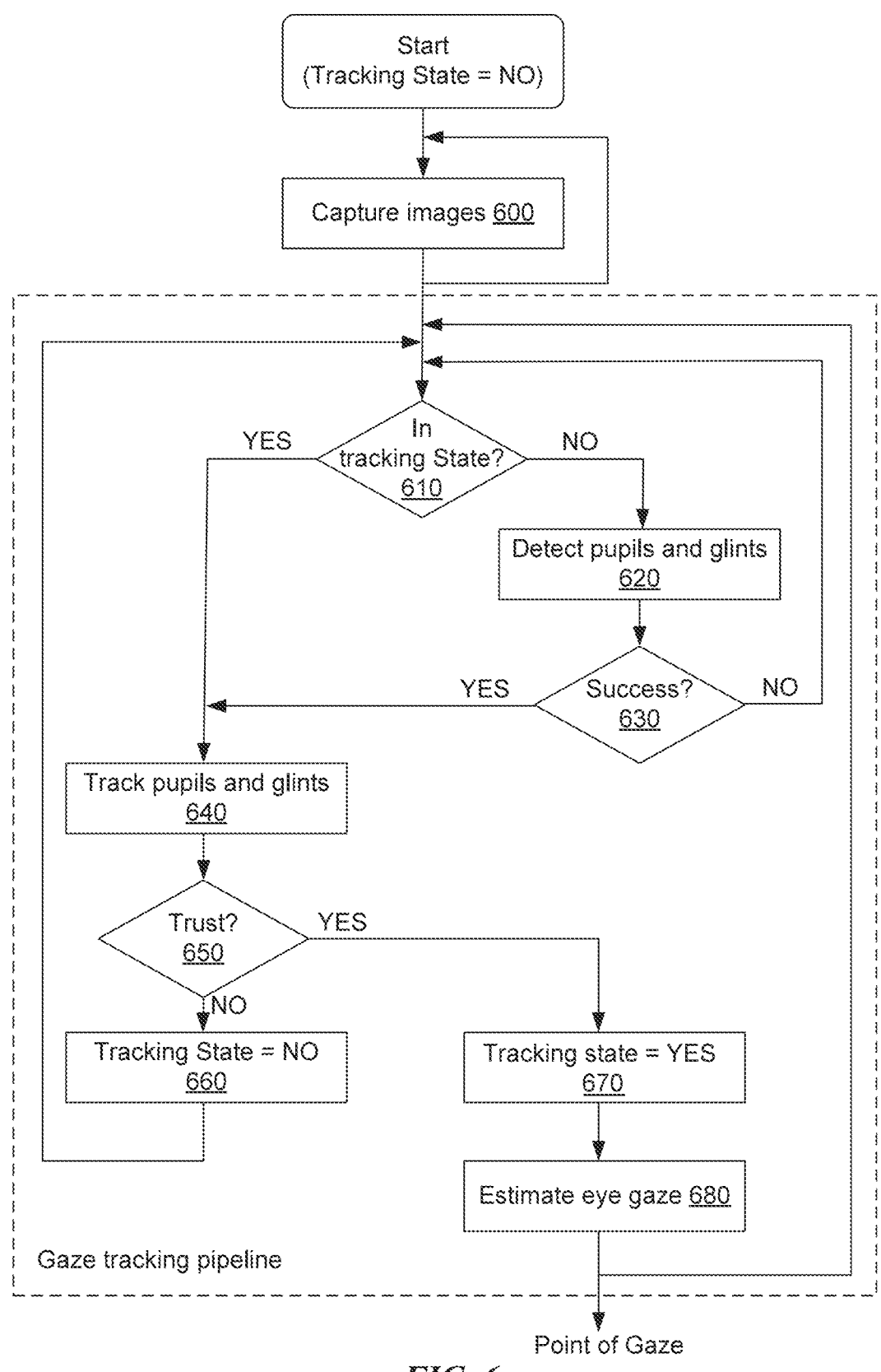
FIG. 6 is a flow diagram illustrating a glint-assisted gaze tracking pipeline in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

Digital Assistant System

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., computer system 101, controller 110, display generation component 120, and/or device 804) and communicates with the server portion (e.g., controller 110 as implemented on a remote server located outside of the scene 105) through one or more networks, e.g., as described with respect to FIG. 1. In some examples, digital assistant system 700 is an implementation of controller 110 as implemented on a remote server located outside of the scene 105. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to computer system 101, controller 110, display generation component 120, and/or device 804 in FIGS. 1, 2, 3, and 8A, respectively. In some examples, digital assistant system 700 represents the server portion of a digital assistant implementation, and can interact with the user through a client-side portion residing on a user device (e.g., computer system 101 and/or device 804).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as computer system 101, controller 110, display generation component 120, and/or device 804 in FIGS. 1, 2, 3, and 8A, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
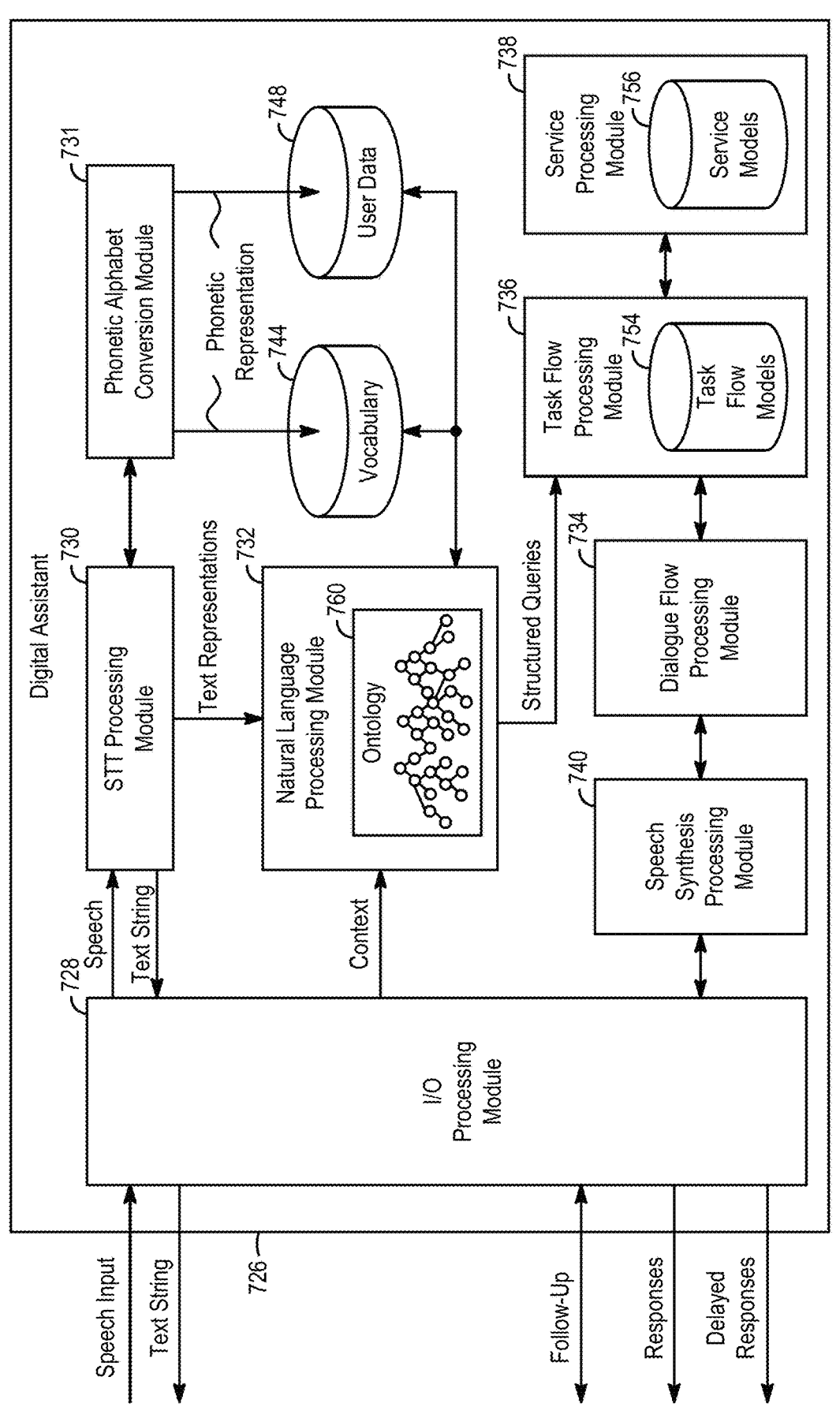
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., computer system 101, controller 110, display generation component 120, and/or device 804) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., computer system 101, controller 110, display generation component 120, and/or device 804) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪɾoʊ/ is ranked higher than /təˈmɑtoʊ/ because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪɾoʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪɾoʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /təˈmeɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

Figure 7C:
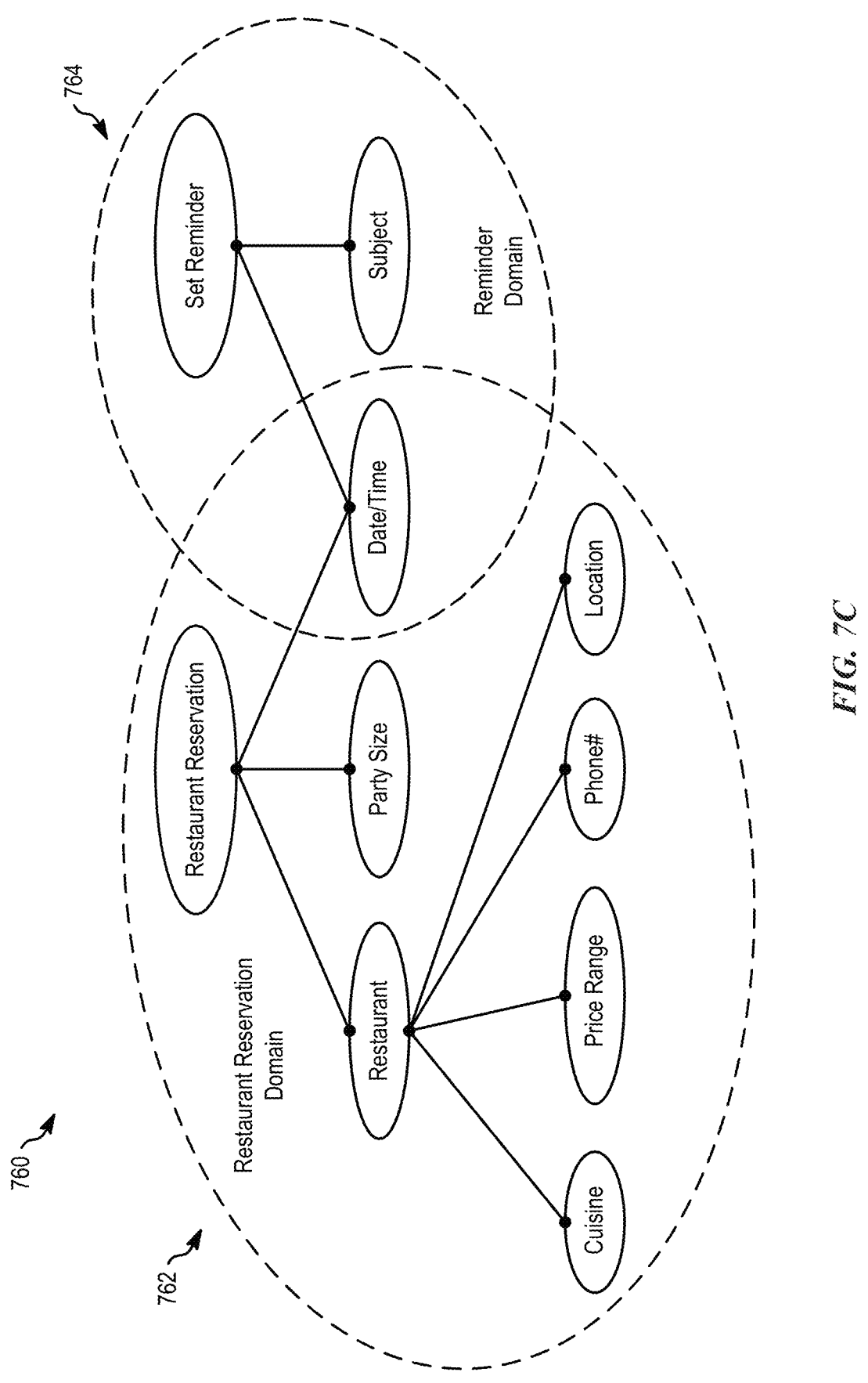
FIG. 7C illustrates a portion of an ontology, according to various examples.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says, "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents is provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., a server system), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

User Interfaces and Associated Processes

Attention is now directed towards embodiments of user interfaces ("UI") and associated processes that may be implemented on one or more electronic devices, such as a computer system, portable multifunction device and/or a head-mounted device, with one or more displays, processors, and memory, and optionally one or more input devices (e.g., hardware input devices, cameras, sensors, and/or other peripheral devices).

FIGS. 8A-8N illustrate examples of providing and controlling an immersive XR output. FIG. 9 is a flow diagram of an exemplary method 900 for providing and controlling an immersive XR output. The user interfaces in FIGS. 8A-8N are used to illustrate the processes described below, including the processes in FIG. 9.

FIGS. 8A-8C illustrate example system 800 for providing an immersive XR output to user 802 using device 804. Device 804 is a head-mounted device (HMD) (e.g., a headset or smart glasses), which includes one or more panoramic displays that substantially cover and/or extend beyond user 802's field of view (e.g., wrapping around into user 802's peripheral vision). In some embodiments, device 804 includes optionally one or more input devices and/or sensors (e.g., touch input devices (e.g., buttons, knobs, and/or pressure-sensitive surfaces), microphones, cameras, motion sensors, infrared sensors, and so forth).

As illustrated in FIG. 8A, user 802 is situated in physical environment 806, for example, an office with walls, windows, a desk, and a computer. In some embodiments, user 802 can view physical environment 806 while using device 804, for example, using pass-through video of physical environment 806 and/or directly through transparent or semi-transparent displays of device 804. As illustrated in FIG. 8B, in order to provide an immersive XR output to user 802, device 804 generates virtual environment 808 (e.g., virtual content superimposed over physical environment 806), for example, a virtual scene of a beach.

FIG. 8C-8N illustrate example output 810 of system 800, e.g., via the one or more displays and/or other output devices (e.g., speakers, haptics, etc.) of device 804. At FIG. 8C, output 810 includes displaying portion 808A of virtual environment 808. For example, at FIG. 8C, portion 808A displayed in output 810 takes up the entirety of the user's field-of-view via device 804. Virtual environment 808 includes environment-locked XR content, such that as user 802 changes their viewpoint (e.g., moves device 804), the portion of virtual environment 808 displayed in output 810 changes accordingly. For example, as illustrated in FIG. 8C, portion 808A of virtual environment 808 includes the horizon, setting sun, and parts of a palm tree and beach umbrella, but user 802 could turn their head or body to the right to view more of the beach umbrella, walk over to the left to view the palm tree closer up, and so forth. Accordingly, output 810 provides an immersive XR experience to user 802.

Figure 8D:

At FIG. 8D, output 810 allows user 802 to view portion 806A of physical environment 806. For example, via pass-through video or directly through transparent portions of the one or more displays of device 804, user 802 can see portions of the walls, windows, desk, and computer present in physical environment 806. System 800 receives spoken input 812, "Hey Assistant, what environments do I have?" from user 802. System 800 determines (e.g., using a digital assistant system 700) that spoken input 812 includes a request for information on immersive XR outputs.

Figure 8E:
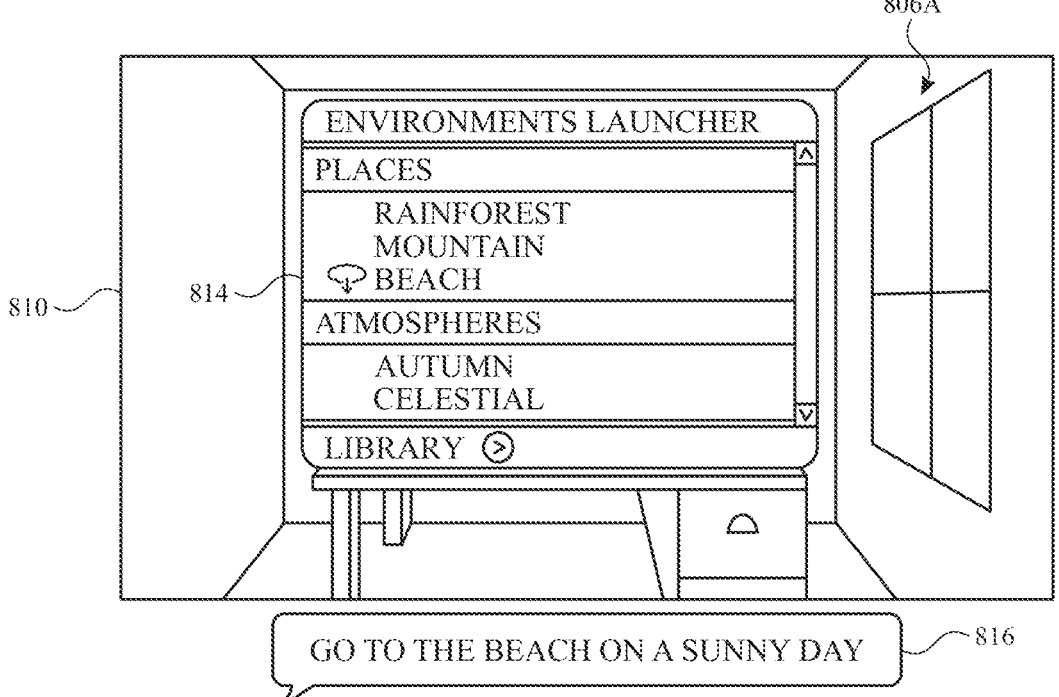

Accordingly, at FIG. 8E, in response to receiving spoken input 812, system 800 updates output 810 to include displaying user interface 814 including a menu with selectable options for immersive outputs. For example, user interface 814 may include selectable options for immersive outputs available using device 804, such as XR rainforest, mountain, and beach environments, and XR autumn and celestial environmental (e.g., atmospheric) effects, which may be downloaded and/or installed on device 804, or may be available to download and/or install from an online reposi-tory (e.g., a cloud/server library of immersive outputs). As illustrated in FIG. 8E, in some embodiments, user interface 814 is displayed as a viewpoint-locked object in output 810, for example, superimposed over the current view of physical environment 806 (e.g., over portion 806A).

Figure 8F:
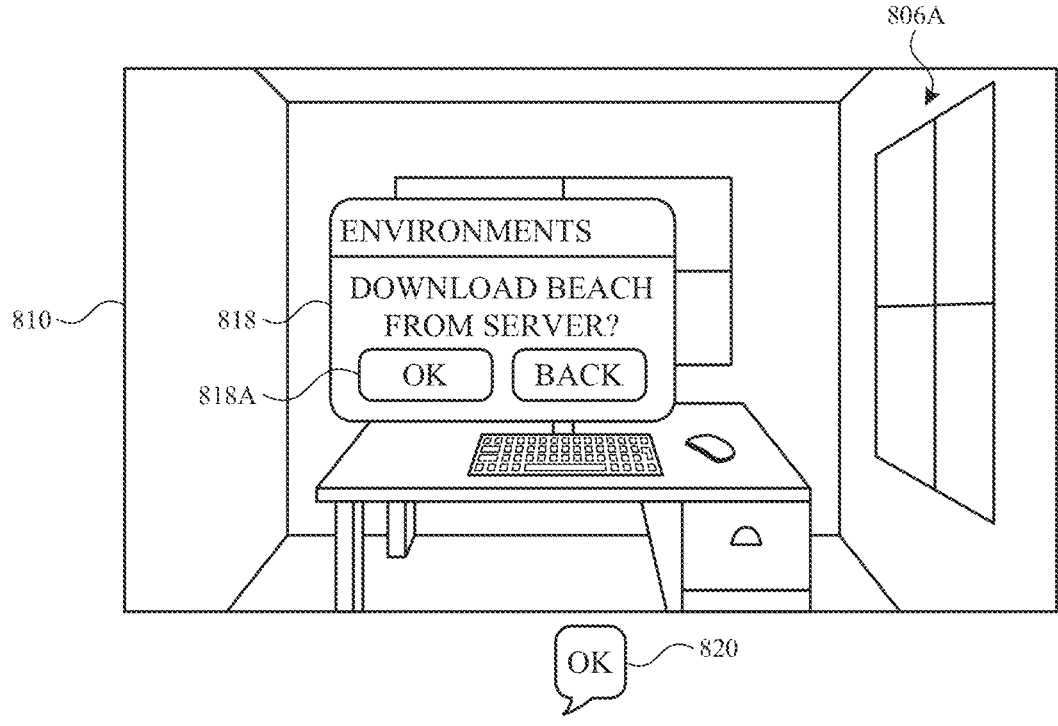

At FIG. 8E, system 800 receives spoken input 816, "Go to the beach on a sunny day." Based on spoken input 816, system 800 determines that user 802 has requested an immersive output, and moreover, that the user has specifi-cally requested an XR beach environment. As the XR beach environment is not currently downloaded and/or installed on device 804, but is included in the online repository (e.g., as indicated by the cloud icon in user interface 814), at FIG. 8F, system 800 updates output 810 to display user interface 818. As discussed with respect to user interface 814, in some embodiments, user interface 818 is displayed as a view-point-locked object in output 810. User interface 818 indi-cates that the XR beach environment is available for down-load from the online repository server, for example, by selecting affordance 818A and/or otherwise instructing sys-tem 800 (e.g., via digital assistant system 700) to obtain the XR beach environment. As illustrated in FIG. 8F, system 800 receives spoken input 820, "Ok," instructing system 800 to download the XR beach environment in order to provide the requested immersive output.

Figure 8G:
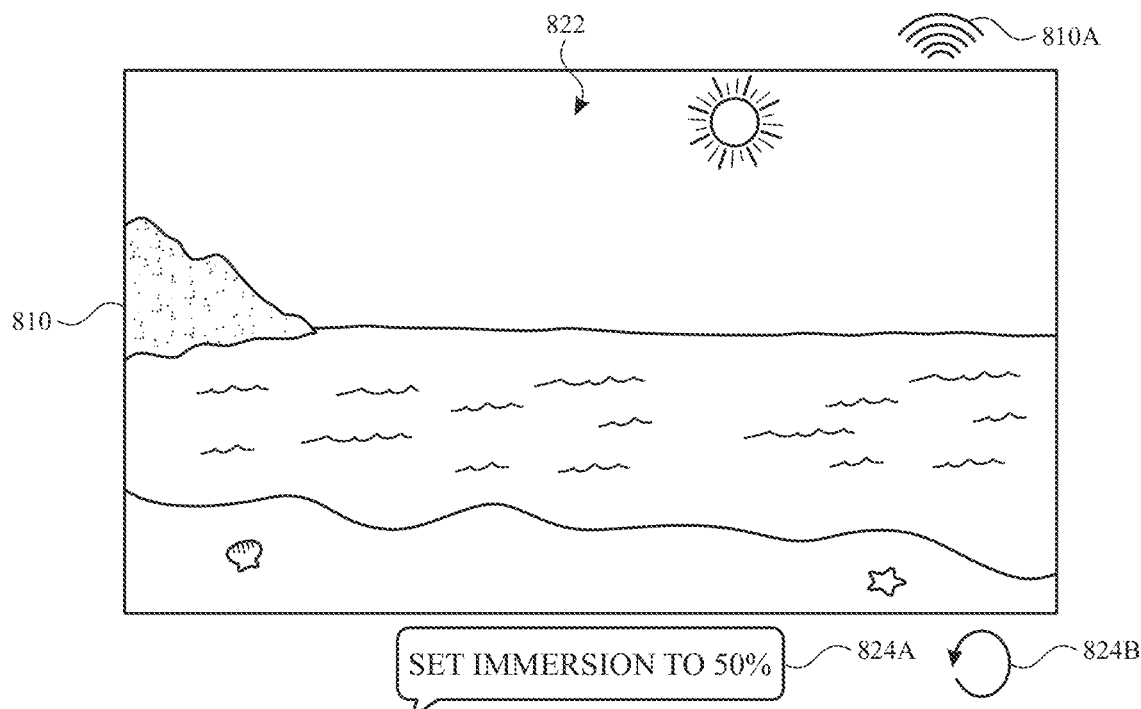

At FIG. 8G, in response to the request received in spoken input 816, system 800 updates output 810 to provide an immersive output, including displaying XR environment 822, a downloaded XR beach environment. As illustrated in FIG. 8G, XR environment 822 opaquely overlays physical environment 806, creating the immersive effect of being within XR environment 822 (e.g., as opposed to being within physical environment 806).

In some embodiments, the display of XR environment 822 is controlled by one or more user-adjustable parameters, such as parameters corresponding to a level of immersion, time of day, weather condition, season, and/or other quality of XR environment 822. For example, a parameter corre-sponding to the level of immersion is initialized at a default value of 100%, such that XR environment 822 is rendered to extend beyond user 802's field-of-view and is displayed overlaying physical environment 806 even as user 802 changes their viewpoint to a certain extent (e.g., as illus-trated in FIGS. 8B-8C; in some embodiments, even at an immersion level of 100%, portions of physical environment 806 (e.g., the portion of physical environment 806 directly behind user 802 when XR environment 822 is initially displayed) are visible from certain viewpoints (e.g., if user 802 turns to look backwards)). As another example, as spoken input 816 included the specific request to provide the XR beach environment "on a sunny day," one or more parameters corresponding to the time of day and/or weather condition are initialized such that XR environment 822 is rendered with the sun high in the sky, few clouds, and/or other lighting qualities or XR objects evoking the beach on a sunny day.

As illustrated in FIG. 8G, system 800 further updates output 810 to provide an audio output 810A. For example, audio output 810A may include sound effects corresponding to XR environment 822, such as the sound of waves, bird sounds, or wind, and/or other audio outputs, such as music. In some embodiments, audio output 810A is provided using a speaker array to create a spatial audio effect, for example, where portions of audio output 810A sound as though they are emanating from particular positions around user 802.

At FIG. 8G, system 800 receives a user input, such as spoken user input 824A, "Set immersion to 50%," or hard-ware input 824B, a rotation of a hardware knob. System 800 determines a user intent of adjusting the parameter corre-sponding to the level of immersion of output 810. For example, a user intent of setting the level of immersion to 50% can be derived from spoken user input 824A, e.g., using a digital assistant system (e.g., 700) of system 800. In some embodiments, the hardware knob is associated with the user-adjustable parameter corresponding to the level of immersion, and the intent of setting the level of immersion to 50% can be derived from the direction and amount of rotation of the hardware knob. For example, the intent to decrease immersion may be determined based on hardware input 824B being a counter-clockwise rotation, and the intent to decrease immersion 50% may be determined based on hardware input 824B rotating the hardware knob 180° from a starting position.

Figure 8H:
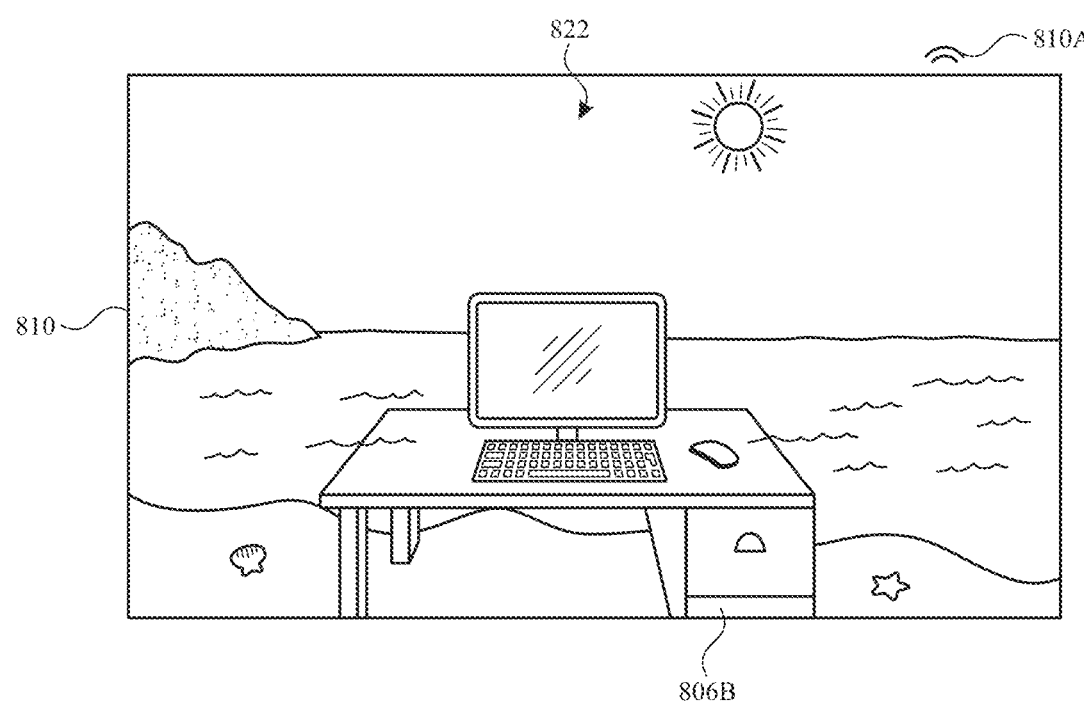
Figure 8I:
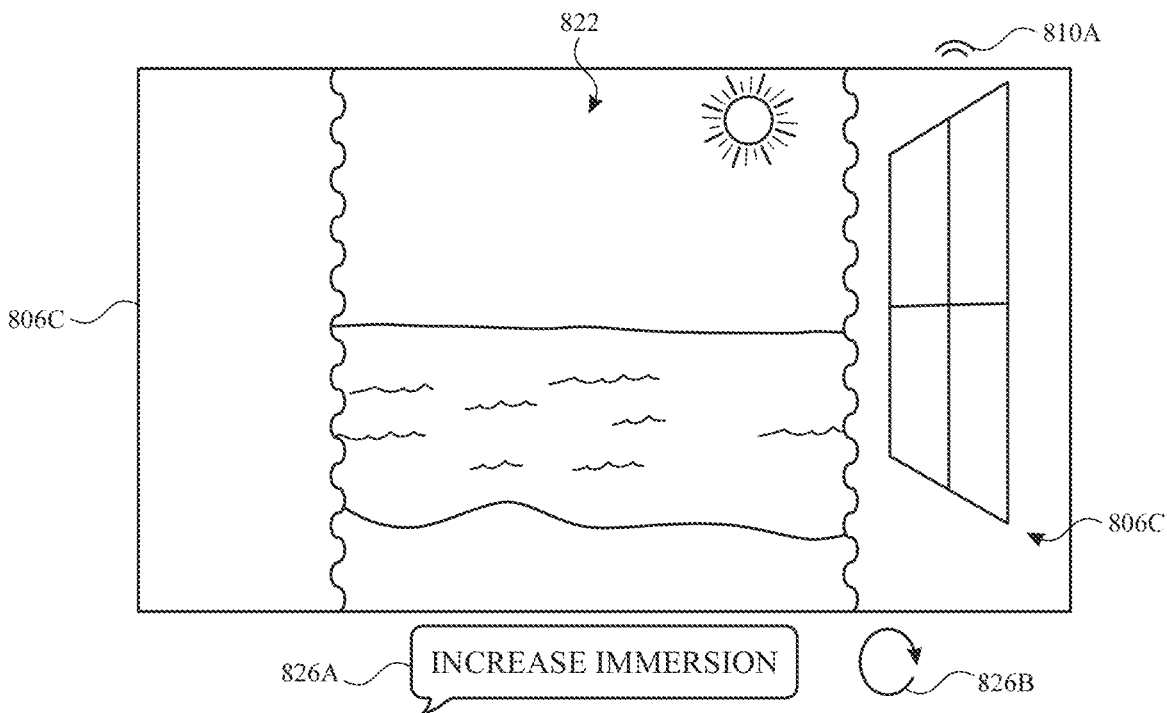

In response to the user input (e.g., 824A and/or 824B), system 800 modifies output 810, decreasing the parameter corresponding to the level of immersion of output 810 to 50% immersion. FIGS. 8H and 8I illustrate ways in which the level of immersion can be decreased with respect to FIG. 8G. As illustrated in FIG. 8H, decreasing the immersion of output 810 (e.g., to 50%) can include modifying the display of XR environment 822 to expose particular elements of physical environment 806 (e.g., elements of physical envi-ronment 806 known to and/or identified by system 800, for example, using a map and/or other data structure represent-ing the room and its contents and/or using object recognition and sensing techniques (e.g., based on camera data and/or depth sensor data) to identify contents of the room to expose). For example, while XR environment 822 still opaquely overlays much of physical environment 806, por-tion 806B, corresponding to the desk and computer, emerges into view. Additionally or alternatively, as illustrated in FIG. 8I, decreasing the immersion of output 810 (e.g., to 50%) can include modifying the display of XR environment 822 to expose particular regions of physical environment 806. For example, while XR environment 822 still opaquely overlays the region of physical environment 806 in the center of user 802's field-of-view, portion 806C of physical environment 806 emerges into view at the periphery of user 802's field-of-view, allowing user 802 to see portions of the side walls and window. Additionally or alternatively, decreasing the immersion of output 810 (e.g., to 50%) can include modifying the opacity of some or all of XR envi-ronment 822, for example, displaying the edge regions of output 810 semi-transparently to partially expose physical environment 806 at the periphery of the user's field-of-view. Additionally or alternatively, audio output 810A can be adjusted to decrease aural immersion, for example, lowering the volume or reducing a spatial audio (e.g., surround sound) effect.

As illustrated in FIG. 8I, system 800 receives a user input, such as spoken user input 826A, "Increase immersion," or hardware input 826B, a clockwise rotation of a hardware knob, and determines a user intent to increase the level of immersion (e.g., as described with respect to FIG. 8G). Accordingly, at FIG. 8J, system 800 modifies output 810 such that smaller portion 806D of physical environment 806 is visible. Alternatively, if the immersion had been decreased as illustrated in FIG. 8H, system 800 could modify output 810 such that XR environment 822 once again opaquely overlays the desk in physical environment 806, but the computer remains visible.

Figure 8J:
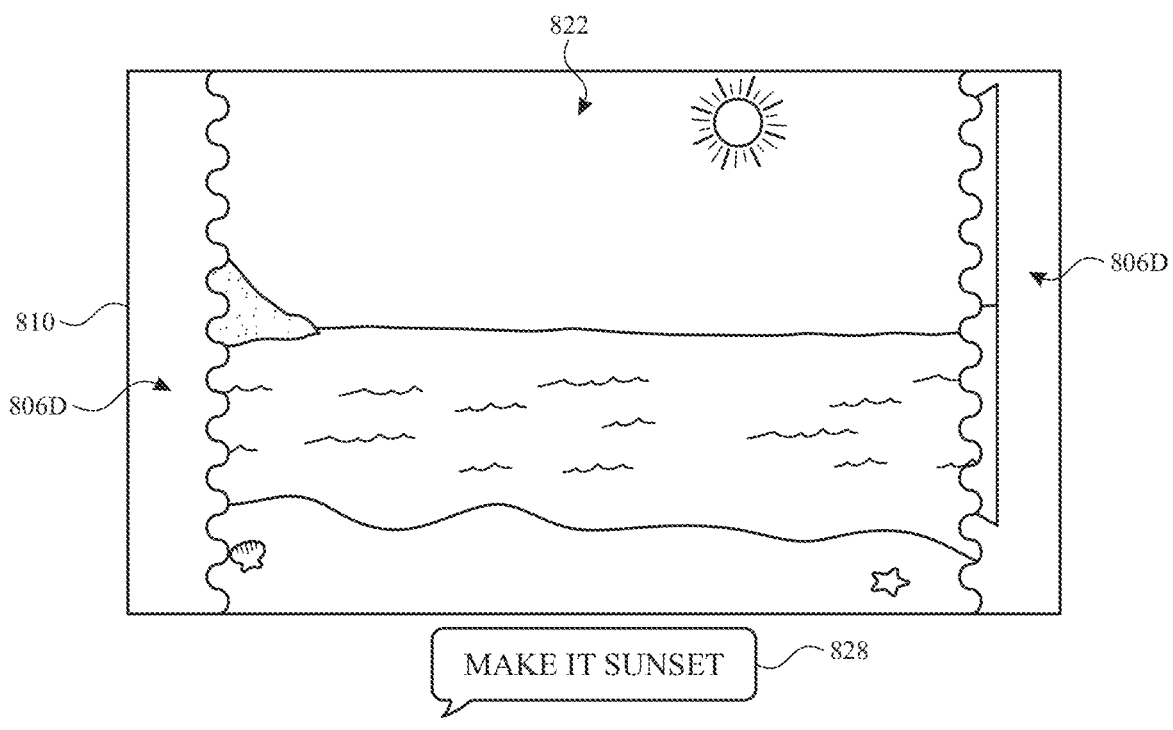

At FIG. 8J, system 800 receives spoken user input 828, "Make it sunset." System 800 determines (e.g., using a digital assistant system such as digital assistant system 700) a user intent of adjusting the parameter corresponding to the time of day of XR environment 822. Accordingly, at FIG. 8K, system 800 modifies output 810, setting the parameter corresponding to the time of day of XR environment to sunset, rendering XR environment 822 with the sun low on the horizon and/or other lighting qualities or XR objects evoking the beach at sunset.

Figure 8K:
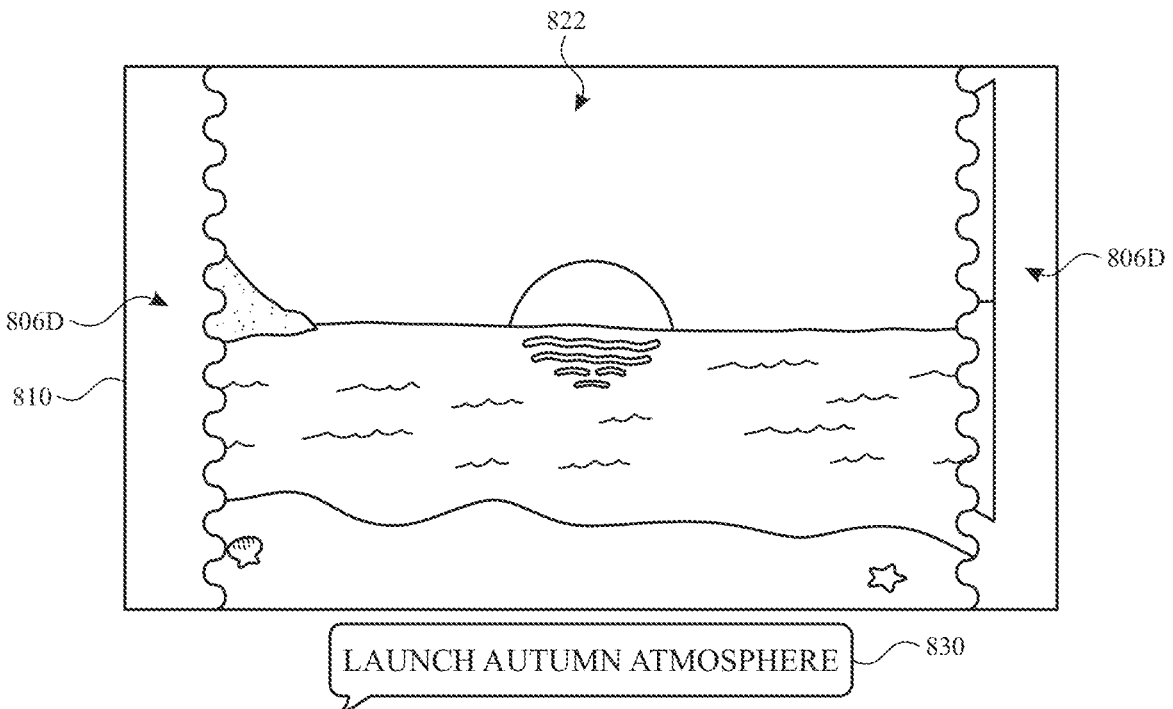

At FIG. 8K, system 800 receives spoken user input 830, "Launch autumn atmosphere." System 800 determines (e.g., using a digital assistant system such as digital assistant system 700) a user intent to switch output 810 to a different immersive environment, and in particular, a request to switch to an autumn environmental (e.g., atmospheric) effect.

Accordingly, at FIG. 8K, system 800 modifies output 810 by ceasing to display XR environment 822 and instead displaying XR environmental effect 832. Unlike XR environment 822, which created an immersive effect by opaquely overlaying (e.g., hiding) physical environment 806, XR environmental effect 832 creates an immersive effect by changing the "atmosphere" of physical environment 806 to have an autumnal look and feel, and thus, physical environment 806 remains visible concurrently with XR environmental effect 832. For example, displaying XR environmental effect 832 can include displaying a semi-transparent or translucent filter overlaying physical environment 806, altering the appearance of physical environment 806 when viewed via device 804, such as a color filter applying warm orange color grading to physical environment 806. As another example, displaying XR environmental effect 832 can include rendering and/or displaying XR objects 832A, such as falling leaves, dust particles, or the like. As another example, displaying XR environmental effect 832 can include rendering and/or displaying XR lighting effects 832B, such as rendering a light source to create sunbeams, shadows, or the like.

In some embodiments, as an atmospheric immersive output, fewer user-adjustable parameters and/or parameter values are used to control the display of XR environmental effect 832 (e.g., compared to the user-adjustable parameters used to control the display of XR environments such as XR environment 822). For example, system 800 may only display XR environmental effect 832 in an "on" state (e.g., at 100% immersion) or an "off" state (e.g., at 0% immersion), rather than adjusting the display of XR environmental effect 832 to create different levels of immersion.

While providing immersive outputs such as XR environment 822 or environmental effect 832, user 802 can access functionality of device 804 unrelated to the immersive output, such as using device 804 to access other applications, retrieve information, control a digital assistant, or control connected devices. For example, as illustrated in FIG. 8L, output 810 includes application user interface 834 for a media player application, which is currently playing music from a playlist.

Figure 8L:
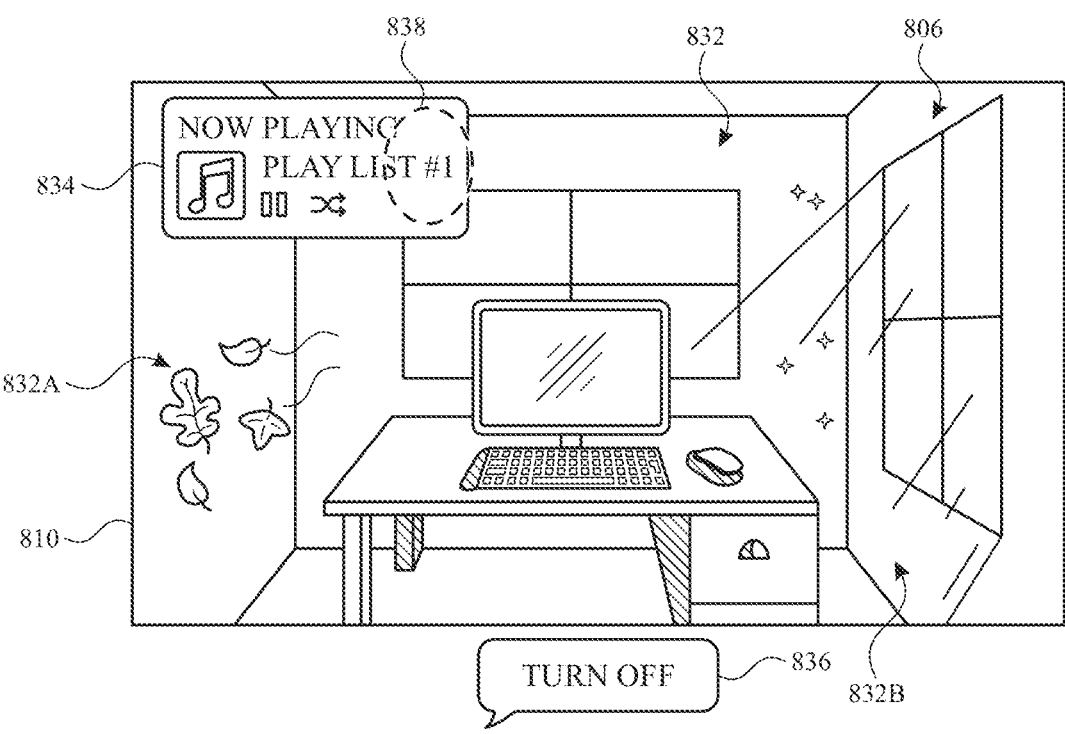

At FIG. 8L, system 800 receives spoken user input 836, "Turn off." In response to receiving spoken user input 836, system 800 determines whether spoken user input 836 is a request directed to the current immersive output (e.g., environmental effect 832) or to other functionality of device 804. For example, based on detecting gaze 838 in the region of application user interface 834 at the time spoken user input 836 is received, system 800 determines that spoken user input 836 is a request to stop the playback of music. As another example, system 800 may determine that spoken user input 836 is a request to stop the playback of music based on the current application focus (e.g., if user 802 recently opened and/or interacted with application user interface 834). Accordingly, at FIG. 8M, system 800 stops the playback of music with the media player application.

Figure 8M:
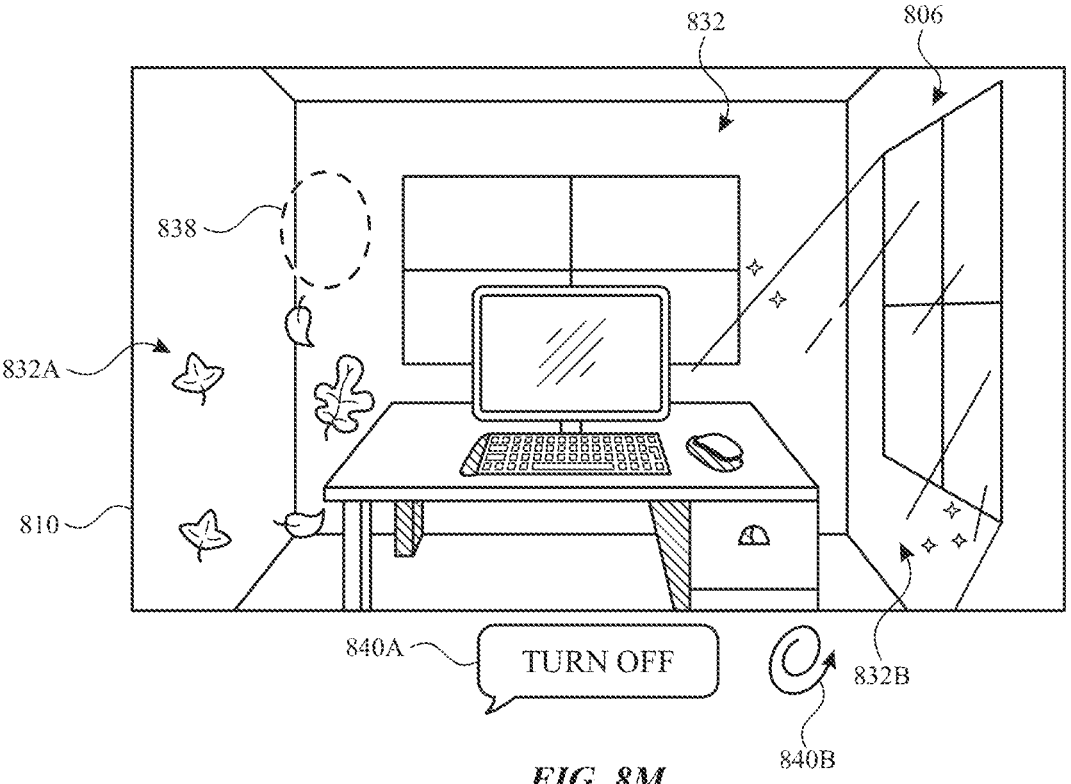

At FIG. 8M, system 800 receives a user input such as spoken user input 840A, "Turn off," and/or hardware input 840B, a counter-clockwise rotation of a hardware knob. As discussed with respect to spoken user input 836, system 800 determines whether the user input is directed to the current immersive output (e.g., environmental effect 832). For example, as gaze 838 is not directed to an application user interface or device controllable by device 804 at the time spoken user input 836 is received, system 800 determines that spoken user input 840A is a request to exit immersion. As another example, as hardware input 840B is an input via a hardware knob associated with the level of immersion and is a counter-clockwise rotation corresponding to a decrease in immersion, system 800 determines that hardware input 840B is a request to set immersion to 0% (e.g., exiting immersion). Accordingly, at FIG. 8N, system 800 modifies output 810 to cease displaying environmental effect 832 (e.g., setting immersion to 0%).

Additional descriptions regarding FIGS. 8A-8N are provided below in reference to method 900 described with respect to FIG. 9.

FIG. 9 is a flow diagram of an exemplary method 900 for providing and controlling an immersive XR output, in some embodiments. In some embodiments, method 900 is performed at one or more electronic devices (e.g., computer system 101 of FIG. 1, head-mounted device 804 of FIG. 8A (e.g., a headset and/or smart glasses), and/or another user device (e.g., a mobile phone and/or a tablet)) including one or more displays (e.g., display generation component 120 in FIGS. 1, 3, and 4) (e.g., a heads-up display, a touchscreen, a projector, and/or another opaque, transparent, and/or semi-transparent display), one or more processors, memory, and optionally one or more input devices and/or sensors (e.g., touch input devices (e.g., buttons, knobs, and/or pressure-sensitive surfaces), microphones, cameras, motion sensors, infrared sensors, and so forth). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 900 are, optionally, combined and/or the order of some operations is, optionally, changed.

At block 902, a first spoken input (e.g., 816) is received. For example, the first spoken input can include a natural-language speech utterance (e.g., "Take me to the beach," "I'd like to see the rainforest," or "Make it autumn") and/or one or more keywords (e.g., "Open beach," "Rainforest," or "Autumn atmosphere"), and may be in the form of a digital assistant request (e.g., a request with a spoken digital assistant trigger (e.g., "Hey Assistant, take me to the beach" or "Siri, open beach") or made in a digital assistant context (e.g., after pressing a button or affordance associated with the digital assistant or while a digital assistant UI or indicator is being displayed).

In response to determining that the first spoken input includes a request for an immersive output (e.g., a panoramic and/or spatial/surround sound output (e.g., an environment)), at block 904, a first immersive output is provided, which includes displaying a first environmental effect (e.g., a place, such as XR environment 822, or an atmosphere, such as XR environmental effect 832). For example, determining that the first spoken input includes a request for an immersive output may include determining a user intent (e.g., as described above with respect to digital assistant system 700) to launch an immersive output and/or determining that the user has named an available (e.g., locally downloaded and/or installed or available to download/install from an online repository or library) immersive output, such as a place (e.g., beach, rainforest, mountain, etc.) or an atmosphere (e.g., autumnal, celestial, foggy).

In some embodiments, the first environmental effect to be displayed is determined (e.g., using speech processing techniques as described above) based on the first spoken user input (and, in some embodiments, additional contextual information, such as the currently available immersive outputs, recently used or requested environments, user favorites, and so forth). In some embodiments, determining that the first spoken output includes a request for an immersive output uses fuzzy matching, for example, matching keywords such as "forest," "the Amazon," or "jungle" to a particular installed rainforest environment, or matching "fall," "autumn," or "cottagecore" to a particular installed autumnal atmosphere.

In some embodiments, a first value of a parameter (e.g., a setting, such as a selected environment, an immersion level/percentage, a time of day, a season, a lighting quality, simulated weather, and so forth) of the first environmental effect is determined based on the first spoken user input (e.g., the first spoke user input includes a compound request, such as "Show the mountains at night," "Enter the rainforest at 50%," "Take me to the beach in winter," etc.; in some embodiments, the determination is also based on contextual information, such as recently used environment settings, noise levels, light levels, etc.), and providing the first immersive output includes setting the parameter of the first environmental effect to the first value. For example, as illustrated in FIGS. 8E-8F, based on spoken input 816, the value of "sunny" for a lighting and/or time of day parameter of the XR beach environment can be determined, and accordingly, the XR beach environment is initially displayed with the sun high in the sky and bright, sunny lighting. In some embodiments, providing the first immersive output includes setting the parameter(s) of the first environmental output to a default value. For example, if the user says "Take me to the beach" without specifying any additional parameter values, the XR beach environment may be initially displayed at sunset, on a sunny day, and with "full" immersion (as discussed further below).

In some embodiments, displaying the first environmental effect includes displaying an extended reality (XR) environment (e.g., a rendered virtual environment or "place," e.g., XR environment 822), such as a beach, a rainforest, or a mountain environment. In some embodiments, the XR environment is displayed opaquely overlaying (e.g., covering and/or obscuring at least a part of) a physical environment (e.g., overlaying the physical environment as seen through a transparent display and/or replacing pass-through video of the physical environment). For example, as illustrated in FIGS. 8A-8C, the environmental effect of a beach environment may include environment-locked XR content (e.g., actual and/or computer-generated video and/or still content) such as an ocean, a sandy beachfront, a palm tree, an umbrella, a sun, and so forth superimposed over the user's physical home office. As another example, the environmental effect of a rainforest environment may include environment-locked XR content such as trees, vines, tropical birds, underbrush, sunbeams, and so forth superimposed over the physical environment.

In some embodiments, the XR environment is rendered to extend beyond a field-of-view of a user of the electronic device (e.g., the XR environment extends into and/or beyond the user's peripheral vision, such that additional portions of the XR environment become visible as the user changes the direction of their viewpoint). For example, the XR environment may be displayed using an HMD with a panoramic display such that it appears to a user that the user is in the requested place as opposed to in the physical environment (e.g., as if the user has been transported to the beach, rainforest, or mountain).

In some embodiments, displaying the first environmental effect includes displaying a visual effect (e.g., an "atmosphere" including lighting effects, color effects, particle effects, and/or rendered XR objects to invoke a particular atmospheric effect), which is displayed at least semi-transparently overlaying (e.g., overlaying the physical environment as seen through a transparent display and/or replacing portions of pass-through video of the physical environment) the physical environment. In some embodiments, the physical environment is visible concurrently with the visual effect. For example, the first visual effect is applied (e.g., displayed) like a filter to the physical environment, such that it appears to a user that the appearance of the physical environment has changed, but the user remains "in" the physical environment. In some embodiments, the visual effect is rendered to extend beyond a field-of-view of a user of the electronic device, such that the altered appearance of the physical environment is consistent as the user changes the direction of their viewpoint.

In some embodiments, displaying the visual effect includes displaying an XR lighting effect (e.g., a lighting effect that changes the perceived lighting of the physical environment (e.g., the perceived warmth, color grading, brightness/intensity, direction, and/or source(s) of light)) and/or displaying an XR object (e.g., particle effects (e.g., floating dust, fog, and/or smoke), sunbeams, stars, nebulae, etc.; in some embodiments, the XR objects may be semi-transparent (e.g., sunbeams); in some embodiments, the XR objects may be opaque (e.g., falling leaves)). For example, as illustrated in FIGS. 8L-8M, an "autumnal" atmosphere may include increasing the perceived warmth of the lighting of the physical environment and displaying sunbeams, dust particle effects, and falling leaves. As another example, a "celestial" atmosphere may include decreasing the perceived brightness of the lighting of the physical environment and superimposing a night sky with stars and nebulae over the ceiling of the physical room. As another example, a "foggy" atmosphere may include decreasing the perceived brightness of the lighting of the physical environment, increasing the perceived coolness of the lighting, and displaying fog-like particle effects.

In some embodiments, providing the immersive output includes providing a first audio output (e.g., 810A), such as music and/or sound effects corresponding to the first environmental effect. For example, sound effects such as crashing waves, breeze, and bird noises may be provided along with the first environmental effect of an XR beach environment. As another example, music from an ambient music playlist and/or a tinkling bell sound effect may be provided along with the first environmental effect of a celestial environment.

While providing the first immersive output, at block 906, a first user input (e.g., 824A, 824B, 826A, 826B, 828, 830, 836, 840A, and/or 840B) is received. In some embodiments, the first user input includes a spoken input (e.g., 824A, 826A, 828, 830, 836, and/or 840A), for example, including a natural-language speech utterance, a keyword, and/or a digital assistant request (e.g., "Siri, get me out of here," "Make it sunset," "Launch autumn atmosphere," or "Set immersion to 50%"). In some embodiments, the first user input includes a hardware input (e.g., 824B, 826B, and/or 840B), such as an input using a hardware button or knob or an input to a touch- and/or pressure-sensitive surface (e.g., of a display).

At block 908, in response to receiving the first user input, the first immersive output is modified. In some embodiments where the first user input includes a spoken user input, modifying the first immersive output is performed based on an intent determined (e.g., using speech processing techniques) from the included spoken user input (e.g., an intent to cease the immersive output, an intent to change a parameter/setting of the immersive output, and/or an intent to change to a different environment). In some embodiments where the first user input includes a hardware input, modifying the first immersive output is performed based on a degree of modification determined from the hardware input. For example, as discussed with respect to FIGS. 8I and 8M, the level/percentage of immersion can be increased or decreased by rotating a hardware knob clockwise/counterclockwise by a corresponding amount (e.g., rotating the knob more will increase or decrease the level of immersion more). In some embodiments, modifying the first immersive output includes changing a parameter (e.g., a setting, such as a selected environment, an immersion level/percentage, a time of day, a season, a lighting quality, etc.) of the immersive output (in some embodiments, changing how the first environmental effect is displayed; in some embodiments, changing to a different environmental effect; in some embodiments, changing how an immersive audio output is provided).

In some embodiments, modifying the first immersive output includes changing a level of immersion of the first immersive output. For example, changing the level of immersion can include changing how much of the physical environment is visible with/through the displayed environmental effect (e.g., as illustrated in FIG. 8H), changing how much of the field of view (e.g., how many degrees) the environmental effect overlays (e.g., as illustrated in FIGS. 8I-8J), and/or modifying any audio outputs (e.g., changing the volume and/or adding or subtracting certain sound effects). In some embodiments, nearby elements of the physical environment can be identified using object recognition and sensing techniques (e.g., based on camera data and/or depth sensor data) and/or using a map, data structure, and/or other knowledge base providing information on the physical attributes (e.g., location, position, and/or dimensions) of the elements, and particular elements can be prioritized to expose (e.g., through the first immersive output, as illustrated in FIG. 8H) as the level of immersion reduces. For example, as the level of immersion reduces, objects closest to the user can be exposed first, while further away objects may remain obscured until immersion is reduced to "0%" and/or exited. As another example, contextual information can be used to determine relevant, functional, or important elements of the physical environment (e.g., active electronic devices, furniture, doors, windows, etc.) to expose first, while other elements (e.g., wall décor, rugs, small objects, ceilings, etc.) are exposed later.

In some embodiments, in accordance with a determination that the first user input is a request to decrease the level of immersion, the opacity (e.g., the degree to which the physical environment is visible (e.g., via pass-through video and/or a semi-transparent display) through the overlay of the first environmental effect) of at least a portion of the first environmental effect is reduced, and in accordance with a determination that the first user input is a request to increase the level of immersion, the opacity of at least a portion of the first environmental effect is increased. For example, as the level of immersion reduces, the first environmental effect may "fade" around the periphery, allowing the physical environment to be seen around the edges of the first environmental effect. As another example, the opacity of the entire first environmental effect can be reduced, allowing the user to see the physical environment through the first environmental effect.

In some embodiments, while the environmental effect is rendered to overlay a first portion of the physical environment (e.g., the portion of the physical environment 806 other than portion 806D, as illustrated in FIG. 8J), in accordance with a determination that the first user input is a request to increase the level of immersion, the first environmental effect is rendered to overlay a second portion of the third physical environment that is larger than the first portion (e.g., as illustrated in FIG. 8G), and in accordance with a determination that the first user input is a request to decrease the level of immersion, the first environmental effect is rendered to overlay a second portion of the third physical environment that is smaller than the first portion (e.g., as illustrated in FIG. 8I). In some embodiments, the level of immersion of virtual places (e.g., environmental effects that opaquely overlay (e.g., replace) the physical environment, such as XR beach, rainforest, or mountain environments) can be changed to three or more different levels including an intermediate level (e.g., "full"/"100%" immersion, no/"0%" immersion, and one or more degrees in between), while the level of immersion of atmospheres cannot be changed to an intermediate level (e.g., atmospheres may be set to only 100% or 0% immersion (e.g., on or off)). In some embodiments, even a "full" or "100%" level of immersion may not overlay the entire physical environment, for example, leaving the portion of the physical environment behind the user when the environment is launched visible if the user looks backwards.

In some embodiments, modifying the first immersive output includes modifying a lighting parameter of the first environmental effect. In some embodiments, the lighting parameter may include one or more parameters for controlling e.g., the warmth, color grade, intensity, and/or source of the perceived lighting of the first environmental effect. In some embodiments, the lighting parameter may be a timeof-day setting for the environment, such as morning/dawn lighting, daylight/sunny lighting, sunset/dusk lighting, nighttime/moonlit lighting, etc. (e.g., as illustrated in FIGS. 8J-8K).

In some embodiments, modifying the first immersive output includes ceasing display of the first environmental effect and displaying a second environmental effect different from the first environmental effect. For example, as illustrated in FIGS. 8K-8L, modifying the immersive output includes ceasing display of the XR beach environment and instead displaying the autumn atmosphere. As another example, modifying the immersive output may include switching between two virtual places (e.g., a beach and a rainforest environment) and/or switching between two atmospheres (e.g., an autumn atmosphere and a celestial atmosphere). In some embodiments, modifying the first immersive output includes ceasing to provide the first immersive output (e.g., exiting the immersive output entirely and/or setting the immersion level to 0% or off). For example, in response to a request such as "Siri, get me out of here," "Turn off," or "Exit," the physical environment may be once again fully visible to the user (e.g., via pass-through video and/or an at least semi-transparent display).

In some embodiments, a second spoken user input (e.g., 812) is received (e.g., a natural-language speech input, a digital assistant request, and/or a keyword; e.g., "Show all places," "Hey Siri, what environments do I have?," etc.), and, in response to determining that the second spoken input includes a request for information related to immersive outputs (e.g., environments), a user interface (e.g., an environments menu, library, and/or launcher, such as 814) including one or more immersive output options (e.g., a text list and/or a thumbnail/icon gallery) is displayed. For example, the user interface may include options for downloaded and/or installed environments and/or environments that are available for download/installation from an online library.

In some embodiments, in accordance with a determination that the first environmental effect (e.g., the requested place or atmosphere) is not included in a first immersive output library (e.g., a library of locally downloaded and/or installed environments (e.g., immersive outputs that are immediately ready to launch)) but is included in a second immersive output library (e.g., a server/cloud library or repository of environments), an output (e.g., 818) is provided indicating that the first environmental effect is included in the second immersive output library. In some embodiments, the output includes providing an affordance and/or deep link (e.g., 818A) that, when selected, causes the first environmental effect to be downloaded and/or installed. For example, as illustrated in FIGS. 8E-8F, as the beach environment requested by the user is not currently installed, user interface 818 is provided along with affordance 818A that, when selected, causes the beach environment to be installed and to automatically launch in response to the user's request. In some embodiments, the output includes providing instructions for downloading and/or installing the requested environment. For example, if the user requests a celestial atmosphere that has not yet been downloaded, the output may include instructions on how to install the celestial atmosphere, such as a spoken output such as "Say 'Hey Siri, install the celestial atmosphere' if you'd like me to download it from the server" or a displayed output such as the text "Go to the Environments tab of the App Store and search 'celestial.'"

In some embodiments, a determination is made whether the first user input is related to the first immersive output, for example, based on context information related to the request. For example, determining whether the first user input is related to the first immersive output may be based on a gaze of the user of the electronic device (e.g., 838) at the time the first user input is received (e.g., determining whether the user is looking at the immersive output or something else (e.g., a different application UI, an affordance, and/or a physical object); in some embodiments, a determination that the first user input is related to the first immersive output is made in accordance with a determination that the user is looking at the immersive output). As another example, determining whether the first user input is related to the first immersive output is based on application focus information at the time the first user input is received (e.g., determining whether a different application (e.g., 834) is currently in focus (e.g., whether the user is interacting with the application, the application UI is centrally/prominently displayed, etc.)). As another example, determining whether the first user input is related to the first immersive output is based on a type of the first user input. For instance, an input using a hardware knob may be predetermined to be related to the immersive output (e.g., the hardware knob has a dedicated/single use while an immersive output is being provided).

In these embodiments, block 908 (modifying the immersive output) is performed in accordance with a determination that the first user input is related to the first immersive output, and in accordance with a determination that the first user input is not related to the first immersive output, an action that does not modify the first immersive output is performed (e.g., controlling another application, controlling a smart home device, taking a photo, etc.). For example, as illustrated in FIGS. 8L-8N, the spoken user input "Turn off" turns off the playback of music when a music playing application is in focus and the user is looking at the application UI, whereas the spoken user input "Turn off" causes the immersive output to cease when the music playing application is no longer in focus and the user is no longer looking at another application. As another example, a spoken user input "Turn it up" causes the level of immersion of an immersive output to increase if the current immersion level is less than 100% and the user is looking at the displayed environmental effect, whereas the spoken user input "Turn it up" causes a temperature setting on a nearby thermostat to be increased if the user is looking at the thermostat and/or the immersive output is already at an immersion level of 100%.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve providing and controlling immersive XR outputs. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve speech interpretation techniques used for providing and controlling immersive XR output. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of speech interpretation and immersive outputs, the present technology can be configured to allow users to select to "opt in" or "opt out" of participation in the collection of personal information data during registration for services or anytime thereafter. In another example, users can select not to provide data for personalized speech interpretation and immersive outputs. In yet another example, users can select to limit the length of time data is maintained or entirely prohibit the development of personalized speech interpretation and immersive output profiles. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, speech interpretation can be performed by inferring preferences based on non-personal information data or a bare minimum amount of personal information, such as the content being requested by the device associated with a user, other non-personal information available to the service, or publicly available information.

What is claimed is:

1. An electronic device, comprising:
one or more displays;
one or more processors;
a memory; and
one or more programs, wherein the one or more programs are stored in the memory and configured to be executed by the one or more processors, the one or more programs including instructions for:
receiving a first spoken input;
determining, based on the first spoken input, a first environmental effect;
determining, based on the first spoken input, a first value of a parameter of the first environmental effect;
in response to determining that the first spoken input includes a request for an immersive output, providing a first immersive output, wherein providing the first immersive output includes:
displaying the first environmental effect; and
setting the parameter of the first environmental effect to the first value;
while providing the first immersive output, receiving a first user input; and
in response to receiving the first user input, modifying the first immersive output.

2. The electronic device of claim 1, wherein the electronic device includes a head-mounted device.

3. The electronic device of claim 1, wherein the one or more displays include one or more transparent displays.

4. The electronic device of claim 1, the one or more programs further including instructions for:
receiving a second spoken input; and in response to determining that the second spoken input includes a request for information related to immersive outputs, displaying a user interface including one or more immersive output options.

5. The electronic device of claim 1, the one or more programs further including instructions for:

in accordance with a determination that the first environmental effect is not included in a first immersive output library and a determination that the first environmental effect is included in a second immersive output library, providing an output indicating that the first environmental effect is included in the second immersive output library.

6. The electronic device of claim 1, wherein providing the first immersive output includes providing a first audio output.

7. The electronic device of claim 1, wherein displaying the first environmental effect includes displaying an extended reality (XR) environment.

8. The electronic device of claim 7, wherein the XR environment is displayed opaquely overlaying a first physical environment.

9. The electronic device of claim 7, wherein the XR environment is rendered to extend beyond a field-of-view of a user of the electronic device.

10. The electronic device of claim 1, wherein displaying the first environmental effect includes displaying a visual effect, wherein the visual effect is displayed semi-transparently overlaying a second physical environment.

11. The electronic device of claim 10, wherein the second physical environment is visible concurrently with the visual effect.

12. The electronic device of claim 10, wherein displaying the visual effect includes displaying an XR lighting effect.

13. The electronic device of claim 10, wherein displaying the visual effect includes displaying an XR object.

14. The electronic device of claim 1, the one or more programs further including instructions for:

determining whether the first user input is related to the first immersive output, wherein modifying the first immersive output is performed in accordance with a determination that the first user input is related to the first immersive output; and in accordance with a determination that the first user input is not related to the first immersive output, performing an action that does not modify the first immersive output.

15. The electronic device of claim 14, wherein determining whether the first user input is related to the first immersive output is based on a gaze of a user of the electronic device when the first user input is received.

16. The electronic device of claim 14, wherein determining whether the first user input is related to the first immersive output is based on application focus information when the first user input is received.

17. The electronic device of claim 1, wherein the first user input includes a third spoken input, and wherein modifying the first immersive output is performed based on an intent determined from the third spoken input.

18. The electronic device of claim 1, wherein the first user input includes a hardware input, and wherein modifying the first immersive output is performed based on a degree of modification determined from the hardware input.

19. The electronic device of claim 1, wherein modifying the first immersive output includes ceasing to provide the first immersive output.

20. The electronic device of claim 1, wherein modifying the first immersive output includes changing a level of immersion of the first immersive output.

21. The electronic device of claim 20, wherein, prior to receiving the first user input, the first environmental effect is rendered to overlay a first portion of a third physical environment; and wherein changing the level of immersion of the first immersive output includes:

in accordance with a determination that the first user input is a request to increase the level of immersion, rendering the first environmental effect to overlay a second portion of the third physical environment, wherein the second portion is larger than the first portion; and in accordance with a determination that the first user input is a request to decrease the level of immersion, rendering the first environmental effect to overlay a third portion of the third physical environment, wherein the third portion is smaller than the first portion.

22. The electronic device of claim 1, wherein modifying the first immersive output includes modifying a lighting parameter of the first environmental effect.

23. The electronic device of claim 1, wherein modifying the first immersive output includes:

ceasing display of the first environmental effect; and displaying a second environmental effect different from the first environmental effect.

24. The electronic device of claim 1, wherein modifying the first immersive output includes changing a respective parameter of the immersive output.

25. A non-transitory computer-readable storage medium storing one or more programs, the one or more programs comprising instructions, which when executed by one or more processors of a first electronic device with one or more displays, cause the first electronic device to:

receive a first spoken input;

determine, based on the first spoken input, a first environmental effect;

determine, based on the first spoken input, a first value of a parameter of the first environmental effect;

in response to determining that the first spoken input includes a request for an immersive output, provide a first immersive output, wherein providing the first immersive output includes:

displaying the first environmental effect;

setting the parameter of the first environmental effect to the first value;

while providing the first immersive output, receive a first user input; and in response to receiving the first user input, modify the first immersive output.

26. A method, comprising:

at an electronic device with one or more displays, one or more processors, and memory:

receiving a first spoken input;

determining, based on the first spoken input, a first environmental effect;

determining, based on the first spoken input, a first value of a parameter of the first environmental effect;

in response to determining that the first spoken input includes a request for an immersive output, providing a first immersive output, wherein providing the first immersive output includes:

displaying the first environmental effect;

setting the parameter of the first environmental effect to the first value;

while providing the first immersive output, receiving a first user input; and in response to receiving the first user input, modifying the first immersive output.

27. The non-transitory computer-readable storage medium of claim 25, the one or more programs further comprising instructions for:

in accordance with a determination that the first environmental effect is not included in a first immersive output library and a determination that the first environmental effect is included in a second immersive output library, providing an output indicating that the first environmental effect is included in the second immersive output library.

28. The non-transitory computer-readable storage medium of claim 25, wherein displaying the first environmental effect includes displaying an extended reality (XR) environment.

29. The non-transitory computer-readable storage medium of claim 25, wherein displaying the first environmental effect includes displaying a visual effect, wherein the visual effect is displayed semi-transparently overlaying a second physical environment.

30. The non-transitory computer-readable storage medium of claim 25, the one or more programs further comprising instructions for:

determining whether the first user input is related to the first immersive output, wherein modifying the first immersive output is performed in accordance with a determination that the first user input is related to the first immersive output; and in accordance with a determination that the first user input is not related to the first immersive output, performing an action that does not modify the first immersive output.

31. The non-transitory computer-readable storage medium of claim 25, wherein the first user input includes a third spoken input, and wherein modifying the first immersive output is performed based on an intent determined from the third spoken input.

32. The non-transitory computer-readable storage medium of claim 25, wherein modifying the first immersive output includes changing a level of immersion of the first immersive output.

33. The non-transitory computer-readable storage medium of claim 32, wherein, prior to receiving the first user input, the first environmental effect is rendered to overlay a first portion of a third physical environment; and wherein changing the level of immersion of the first immersive output includes:

in accordance with a determination that the first user input is a request to increase the level of immersion, rendering the first environmental effect to overlay a second portion of the third physical environment, wherein the second portion is larger than the first portion; and in accordance with a determination that the first user input is a request to decrease the level of immersion, rendering the first environmental effect to overlay a third portion of the third physical environment, wherein the third portion is smaller than the first portion.

34. The method of claim 26, further comprising:

in accordance with a determination that the first environmental effect is not included in a first immersive output library and a determination that the first environmental effect is included in a second immersive output library, providing an output indicating that the first environmental effect is included in the second immersive output library.

35. The method of claim 26, wherein displaying the first environmental effect includes displaying an extended reality (XR) environment.

36. The method of claim 26, wherein displaying the first environmental effect includes displaying a visual effect, wherein the visual effect is displayed semi-transparently overlaying a second physical environment.

37. The method of claim 26, further comprising:

determining whether the first user input is related to the first immersive output, wherein modifying the first immersive output is performed in accordance with a determination that the first user input is related to the first immersive output; and in accordance with a determination that the first user input is not related to the first immersive output, performing an action that does not modify the first immersive output.

38. The method of claim 26, wherein the first user input includes a third spoken input, and wherein modifying the first immersive output is performed based on an intent determined from the third spoken input.

39. The method of claim 26, wherein modifying the first immersive output includes changing a level of immersion of the first immersive output.

40. The method of claim 39, wherein, prior to receiving the first user input, the first environmental effect is rendered to overlay a first portion of a third physical environment; and wherein changing the level of immersion of the first immersive output includes:

in accordance with a determination that the first user input is a request to increase the level of immersion, rendering the first environmental effect to overlay a second portion of the third physical environment, wherein the second portion is larger than the first portion; and in accordance with a determination that the first user input is a request to decrease the level of immersion, rendering the first environmental effect to overlay a third portion of the third physical environment, wherein the third portion is smaller than the first portion.

* * * * *